United States Patent
Yoshida

(10) Patent No.: US 8,810,850 B2
(45) Date of Patent: Aug. 19, 2014

(54) CONTROLLING DEVICE FOR PERFORMING IMAGE PROCESSING WITH VARIABLE DISCHARGE AMOUNT COMPENSATION FOR TARGET NOZZLES

(75) Inventor: Yasunari Yoshida, Aichi-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 125 days.

(21) Appl. No.: 12/973,138

(22) Filed: Dec. 20, 2010

(65) Prior Publication Data

US 2011/0149303 A1   Jun. 23, 2011

(30) Foreign Application Priority Data

Dec. 22, 2009 (JP) ................................. 2009-291086

(51) Int. Cl.
*G06K 15/02* (2006.01)
(52) U.S. Cl.
USPC ................ 358/1.2; 358/1.9; 358/3.06; 347/1; 347/5; 347/9; 347/20; 347/78; 382/173; 382/176; 382/180
(58) Field of Classification Search
USPC ............. 358/1.2, 1.9, 3.06; 347/1, 5, 6, 9, 20, 347/78; 382/173, 176, 180
See application file for complete search history.

(56) References Cited

U.S. PATENT DOCUMENTS

2005/0271284 A1* 12/2005 Chen et al. ..................... 382/233
2007/0008555 A1* 1/2007 Hamamoto ..................... 358/1.8
2007/0070424 A1 3/2007 Chiwata
2008/0266339 A1* 10/2008 Snyder et al. .................... 347/12
2009/0232571 A1* 9/2009 Narusawa ....................... 400/76

FOREIGN PATENT DOCUMENTS

| JP | 11-58704 | 3/1999 | |
|---|---|---|---|
| JP | 2000-25212 | 1/2000 | |
| JP | 2001-38892 | 2/2001 | |
| JP | 2001-157055 A | 6/2001 | |
| JP | 2001157055 A * | 6/2001 | ............. H04N 1/405 |
| JP | 2002-112022 A | 4/2002 | |
| JP | 2005-225199 | 8/2005 | |
| JP | 2007-110699 A | 4/2007 | |
| JP | 2008-028802 A | 2/2008 | |

OTHER PUBLICATIONS

Japanese Official Action dated Sep. 3, 2013 received in related application JP 2009-291086.

* cited by examiner

*Primary Examiner* — Jacky X Zheng
(74) *Attorney, Agent, or Firm* — Scully, Scott, Murphy & Presser, P.C.

(57) ABSTRACT

A controlling device may perform an image process on specific image data so as to generate processed image data, select a process mode from a plurality of process modes, including a first process mode and a second process mode, and perform the image process according to the selected process mode. The first process mode may be for performing the image process by performing, in order to compensate variability of discharging amounts of the liquid droplets discharged from the plurality of nozzles, a specific process on a target pixel within target image data using correction data for a target nozzle. The target nozzle may be to form a dot at a position on a print medium corresponding to the target pixel. The second process mode may be for performing the image process by performing the specific process on the target pixel within target image data without using the correction data for the target nozzle.

8 Claims, 13 Drawing Sheets

FIG. 3

Characteristic Data Table 60

| Nozzle Number | Characteristic Data |
|---|---|
| Nk1 | 36 |
| Nk2 | 23 |
| Nk3 | 21.5 |
| Nk4 | 11.5 |
| ⋮ | ⋮ |
| Nkn-1 | 5 |
| Nkn | 17 |

| Nozzle Number | Characteristic Data |
|---|---|
| Nc1 | 25 |
| Nc2 | 13 |
| Nc3 | 12 |
| Nc4 | 10 |
| ⋮ | ⋮ |
| Ncn-1 | 0 |
| Ncn | 12 |

| Nozzle Number | Characteristic Data |
|---|---|
| Nm1 | 18 |
| Nm2 | 10 |
| Nm3 | 23 |
| Nm4 | 12 |
| ⋮ | ⋮ |
| Nmn-1 | 3 |
| Nmn | 8 |

| Nozzle Number | Characteristic Data |
|---|---|
| Ny1 | 13 |
| Ny2 | 18 |
| Ny3 | 0.5 |
| Ny4 | 0 |
| ⋮ | ⋮ |
| Nyn-1 | 1.5 |
| Nyn | 10 |

FIG. 4

Threshold Table 62

| Data Type | Coverage | Threshold |
|---|---|---|
| Text Data | — | 30 |
| Low Concentration Bitmap Data | 171~255 | 20 |
| Middle Concentration Bitmap Data | 85~170 | 10 |
| High Concentration Bitmap Data | 0~84 | 5 |

FIG. 7    Second Print Mode
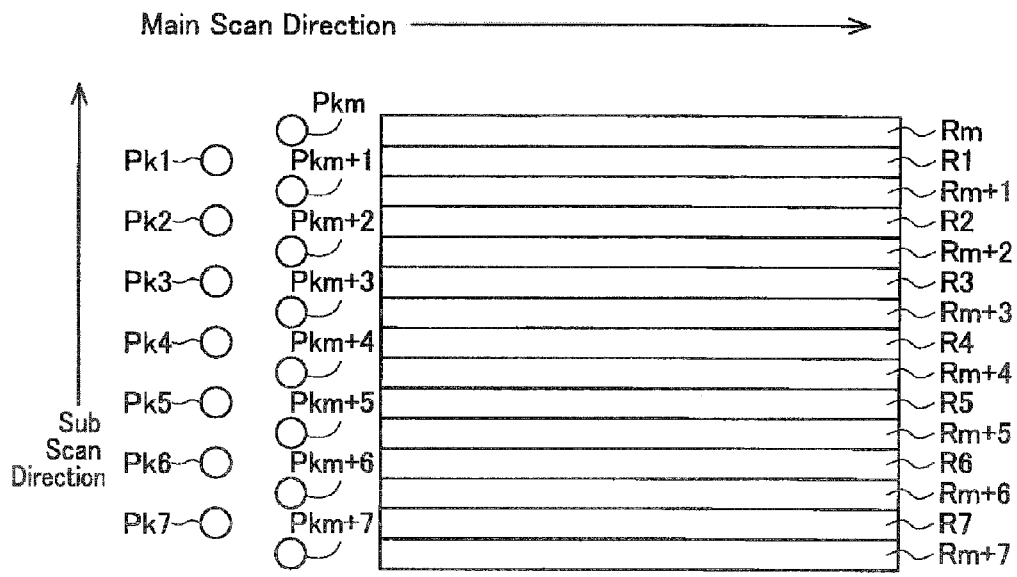
FIG. 8    Third Print Mode
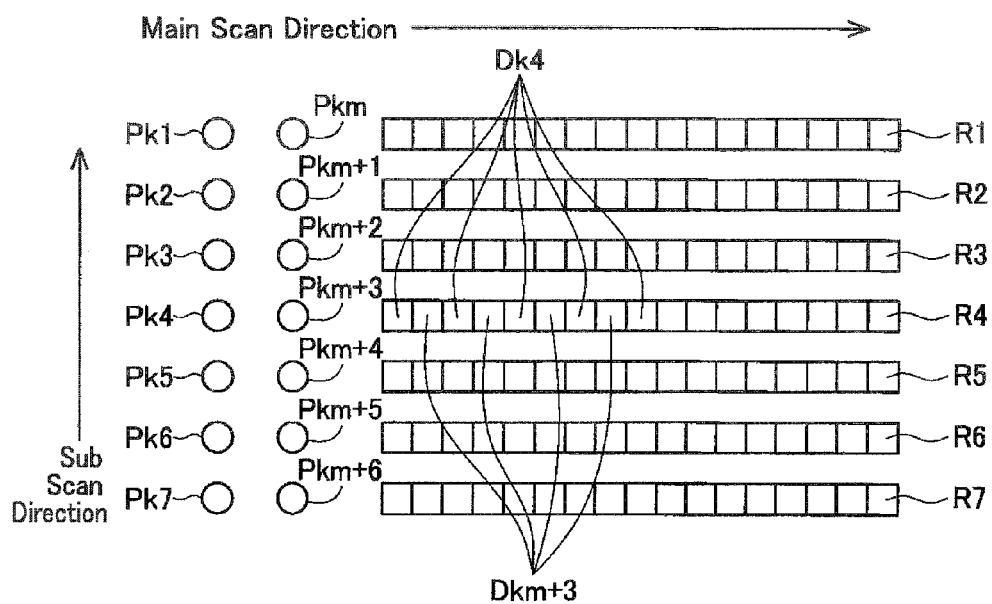

FIG. 11

Converted RGB Image Data 200

| 201 | 202 | | |
|---|---|---|---|
| (i−1,j−1) R(i−1,j−1) G(i−1,j−1) B(i−1,j−1) | (i,j−1) R(i,j−1) G=(i,j−1) B=(i,j−1) | (i+1,j−1) R(i+1,j−1) G(i+1,j−1) B(i+1,j−1) | (i+2,j−1) R(i+2,j−1) G(i+2,j−1) B(i+2,j−1) |
| (i−1,j) R(i−1,j) G(i−1,j) B(i−1,j) | (i,j) R(i,j) G(i,j) B(i,j) | (i+1,j) R(i+1,j) G(i+1,j) B(i+1,j) | (i+2,j) R(i+2,j) G(i+2,j) B(i+2,j) |

CMYK Image Data 210

| 211 | 212 | | |
|---|---|---|---|
| (i−1,j−1) C(i−1,j−1) M(i−1,j−1) Y(i−1,j−1) K(i−1,j−1) | (i,j−1) C(i,j−1) M(i,j−1) Y(i,j−1) K(i,j−1) | (i+1,j−1) C(i+1,j−1) M(i+1,j−1) Y(i+1,j−1) K(i+1,j−1) | (i+2,j−1) C(i+2,j−1) M(i+2,j−1) Y(i+2,j−1) K(i+2,j−1) |
| (i−1,j) C(i−1,j) M(i−1,j) Y(i−1,j) K(i−1,j) | (i,j) C(i,j) M(i,j) Y(i,j) K(i,j) | (i+1,j) C(i+1,j) M(i+1,j) Y(i+1,j) K(i+1,j) | (i+2,j) C(i+2,j) M(i+2,j) Y(i+2,j) K(i+2,j) |

216  217

$\Sigma s \cdot \Delta E = s1 \cdot \Delta E(i-1,j-1) + s2 \cdot \Delta E(i,j-1) + s3 \cdot \Delta E(i+1,j-1) + s4 \cdot \Delta E(i-1,j)$

FIG. 18

Corrected Image Data 250

| | (i−1, j−1)<br>PV(i−1, j−1) | (i, j−1)<br>PV(i, j−1) | (i+1, j−1)<br>PV(i+1, j−1) | (i+2, j−1)<br>PV(i+2, j−1) |
|---|---|---|---|---|
| Second Process Mode ↑<br>↓<br>First Process Mode | (i−1, j)<br>PV"(i−1, j)<br>=CD(i−1, j)<br>× PV(i−1, j) | (i, j)<br>PV"(i, j)<br>=CD(i, j)<br>× PV(i, j) | (i+1, j)<br>PV"(i+1, j)<br>=CD(i+1, j)<br>× PV(i+1, j) | (i+2, j)<br>PV"(i+2, j)<br>=CD(i+2, j)<br>× PV(i+2, j) |

$$CD(i, j) = \underbrace{\frac{255 + \text{Minimum Characteristic Data}}{255 + \text{Target Characteristic Data}}}_{\text{Target Correcting Data}}$$

CONTROLLING DEVICE FOR PERFORMING IMAGE PROCESSING WITH VARIABLE DISCHARGE AMOUNT COMPENSATION FOR TARGET NOZZLES

CROSS-REFERENCE TO RELATED APPLICATIONS

This application claims priority to Japanese Patent Application No. 2009-291086, filed on Dec. 22, 2009, the contents of which are hereby incorporated by reference into the present application.

TECHNICAL FIELD

The present specification discloses a technique for causing a print performing unit to perform print. The print performing unit comprises a print head in which a plurality of nozzles for discharging liquid droplets of a specific color is formed.

DESCRIPTION OF RELATED ART

Many ink jet printers perform an image process (e.g., a halftone process) on CMYK image data that includes a plurality of pixels written in CMYK format so as to create processed image data that includes a plurality of pixels written in binary (no dot, with dot) or ternary or greater (no dot, small dot, medium dot, large dot, etc.). For each of a plurality of pixels within the processed image data, the ink jet printer forms a dot in accordance with the value of the pixel at a position on a print medium corresponding to the pixel. An image represented by the processed image data is thereby formed on the print medium.

There is an ink jet printer which stores characteristic data related to a discharging amount of an ink droplet discharged from each of a plurality of nozzles formed in a print head. Specifically, the characteristic data is data showing a percentage of increase or decrease from a predetermined aimed discharging amount. This ink jet printer corrects CMYK image data using the characteristic data of the nozzles. For example, if a K value of a specific pixel within the CMYK image data is K1, and the characteristic data of a nozzle that forms a dot at a position on the print medium corresponding to the specific pixel is X %, the K value of the specific pixel is corrected using the formula $K1 \times (100\% - X\%)$. The aforementioned correction is performed for each pixel within the CMYK image data. The ink jet printer performs a halftone process on the corrected CMYK image data. Consequently, processed image data is generated in which variability in the discharging amounts of ink droplets discharged from the plurality of nozzles (may be simply termed "discharging amount variability" below) is compensated for.

SUMMARY

For example, there are a situation where image quality is required to be improved and a situation where a print time from a print starting instruction from a user to completing print is required to be shortened. The present application provides a technique for performing an appropriate process according to various situations.

The technique taught by the present specification is a controlling device for causing a print performing unit to perform print. The print performing unit may comprise a print head in which a plurality of nozzles for discharging liquid droplets is formed. The controlling device may comprise an image process unit and a supplying unit. The image process unit may be configured to perform an image process on specific image data so as to generate processed image data. The supplying unit may be configured to supply the processed image data to the print performing unit. The image process unit may comprise a selecting unit. The selecting unit may be configured to select a process mode from a plurality of process modes. The image process unit may perform the image process in accordance with the selected process mode. The plurality of process modes may include a first process mode and a second process mode. The first process mode may be for performing the image process by performing, in order to compensate variability of discharging amounts of the liquid droplets discharged from the plurality of nozzles, a specific process on a target pixel within target image data using correction data for a target nozzle. The target nozzle may be to form a dot at a position on a print medium corresponding to the target pixel. The second process mode may be for performing the image process by performing the specific process on the target pixel within target image data without using the correction data for the target nozzle. The correction data may be data acquired using a target set of characteristic data included in a plurality of sets of characteristic data corresponding to the plurality of nozzles. The target set of characteristic data may be corresponding to the target nozzle. Each set of the characteristic data may be data related to a discharging amount of a liquid droplet of a corresponding nozzle.

Incidentally, a control method, a computer program and a non-transitory recording medium storing such computer program for realizing the controlling device are also novel and useful.

BRIEF DESCRIPTION OF THE DRAWINGS

FIG. 3 shows a characteristic data table.
FIG. 4 shows a threshold table.
FIG. 7 shows a raster group formed in the second print mode.
FIG. 8 shows a raster group formed in a third print mode.
FIG. 11 shows pixels within converted ROB image data.
FIG. 12 shows pixels within CMYK image data
FIG. 18 shows pixels within corrected image data generated by the correction data.

EMBODIMENT (First Embodiment)
(Configuration of System)
A first embodiment will be described with reference to figures. As shown in FIG. 1, a network system 2 comprises a LAN 4, a PC 10, and a printer 50. The PC 10 and the printer 50 are connected to the LAN 4. The PC 10 and the printer 50 can communicate with one another via the LAN 4.

(Configuration of PC 10)

Figure 1:
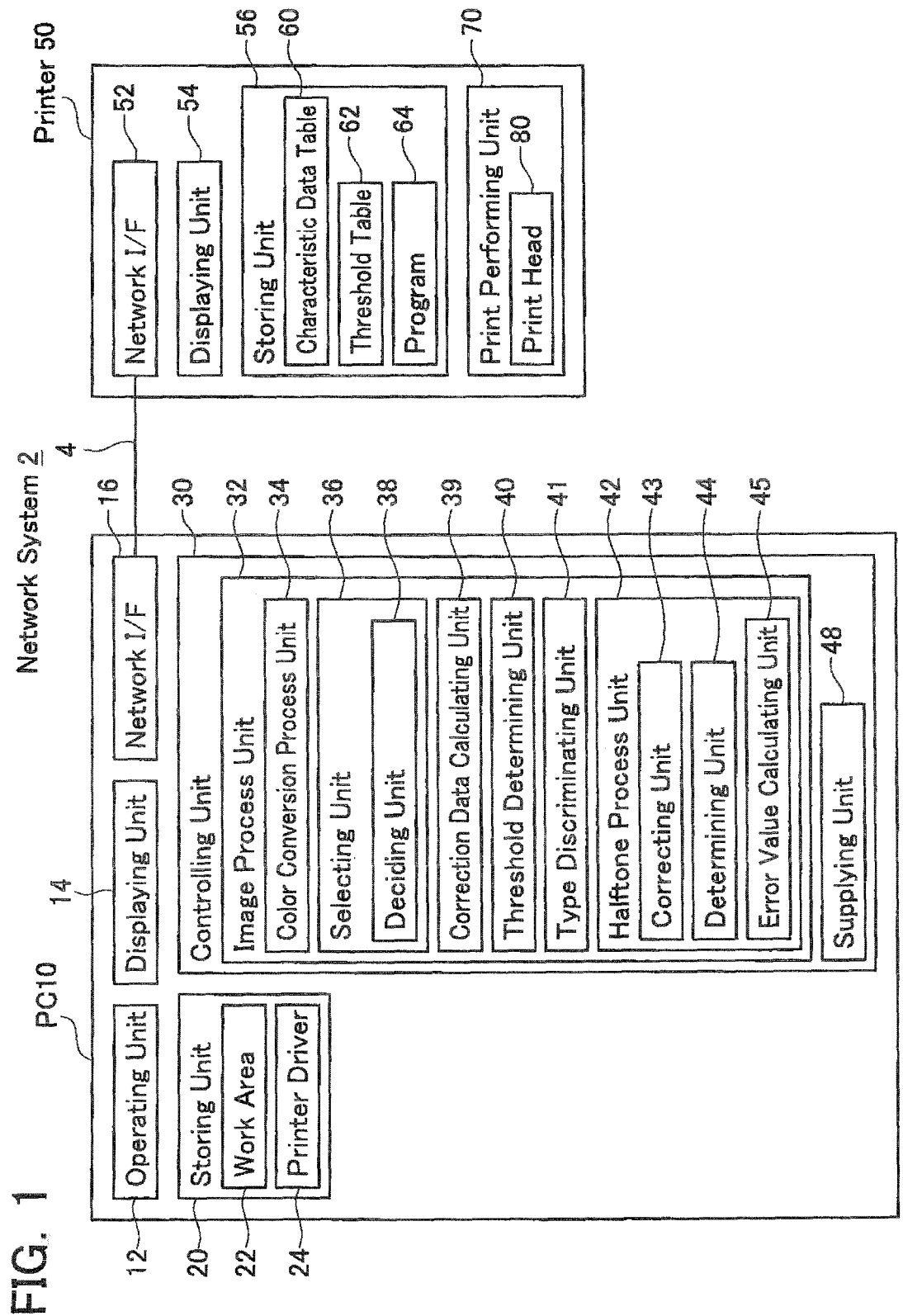
FIG. 1 shows a configuration of a network system.

The PC 10 comprises an operating unit 12, a displaying unit 14, a network interface 16, a storing unit 20, and a controlling unit 30. The operating unit 12 comprises a mouse and a keyboard. A user can input various instructions to the PC 10 by operating the operating unit 12. The displaying unit 14 is a display for showing a variety of information. The network interface 16 is connected to the LAN 4.

The storing unit 20 comprises a work area 22. The work area 22 stores, e.g., original image data of a print target (e.g., original image data shown in FIG. 10). For example, the print target data may be data generated by an application within the PC 10, or may be data acquired from an external device. Examples of the application within the PC 10 are word processing software, spreadsheet software, etc. Examples of the external device are a server on the internet, a device connected to the LAN 4, a portable storage medium, etc. The storing unit 20 further stores a printer driver 24 for the printer 50. The printer driver 24 is software for sending various instructions (e.g., a print instruction) to the printer 50. The printer driver 24 may, e.g., be installed on the PC 10 from a non-transitory computer readable medium storing the printer driver 24, or may be installed on the PC 10 from a server on the internet.

The controlling unit 30 performs various processes in accordance with a program (e.g., the printer driver 24) stored in the storing unit 20. The controlling unit 30 realizes the functions of an image process unit 32 and a supplying unit 48 by performing processes in accordance with the printer driver 24. The image process unit 32 comprises a color conversion process unit 34, a selecting unit 36, a correction data calculating unit 39, a threshold determining unit 40, a type discriminating unit 41 and a halftone process unit 42. The selecting unit 36 comprises a deciding unit 38. The halftone process unit 42 comprises a correcting unit 43, a determining unit 44, and an error value calculating unit 45.

(Configuration of Printer 50)

The printer 50 comprises a network interface 52, a displaying unit 54, a storing unit 56, and a print performing unit 70. The network interface 52 is connected to the LAN 4. The displaying unit 54 is a display for showing various information. The print performing unit 70 prints, onto a print medium, an image represented by binary data supplied from the PC 10 in accordance with a program 64 stored in the storing unit 56. The print performing unit 70 comprises a print head 80. In addition to the print head 80, the print performing unit 70 comprises a drive mechanism of the print head 80, and a print medium transporting device, etc. (neither is shown).

The drive mechanism of the print head 80 comprises a carriage and a motor that moves the carriage. The print head 80 is mounted removably on the carriage. The carriage moves back and forth in a predetermined direction within a casing of the printer 50. When the carriage moves, the print head 80 also moves. The direction of back and forth movement of the carriage, i.e., the direction of back and forth movement of the print head 80 is termed a "main scan direction." Further, in the present embodiment, one back and forth reciprocal movement of the print head 80 is termed "one main scan." The drive mechanism of the print head 80 further comprises a circuit for supplying a driving signal to the print head 80. When the driving signal is supplied to the print head 80, ink droplets are discharged from a nozzle group 84$k$, etc. (referring to FIG. 2) formed in the print head 80. In the present embodiment, a driving signal to discharge ink droplets from the nozzle group 84$k$, etc. is supplied to the print head 80 during an outgoing stroke of one main scan. Moreover, ink droplets are not discharged from the nozzle group 84$k$, etc. during a returning stroke of the one main scan. The print medium transporting device transports the print medium in a direction orthogonal to the main scan direction. The transport direction of the print medium is termed a "sub scan direction." In other embodiments, driving signals may be supplied to the print head 80 in order to discharge ink droplets from the nozzle group 84$k$, etc. during both the outgoing stoke and the returning stroke of one back and forth movement of the print head 80. In this case, each of the outgoing stroke and returning stroke of one back and forth movement of the print head 80 can be called "one main scan."

Figure 2:
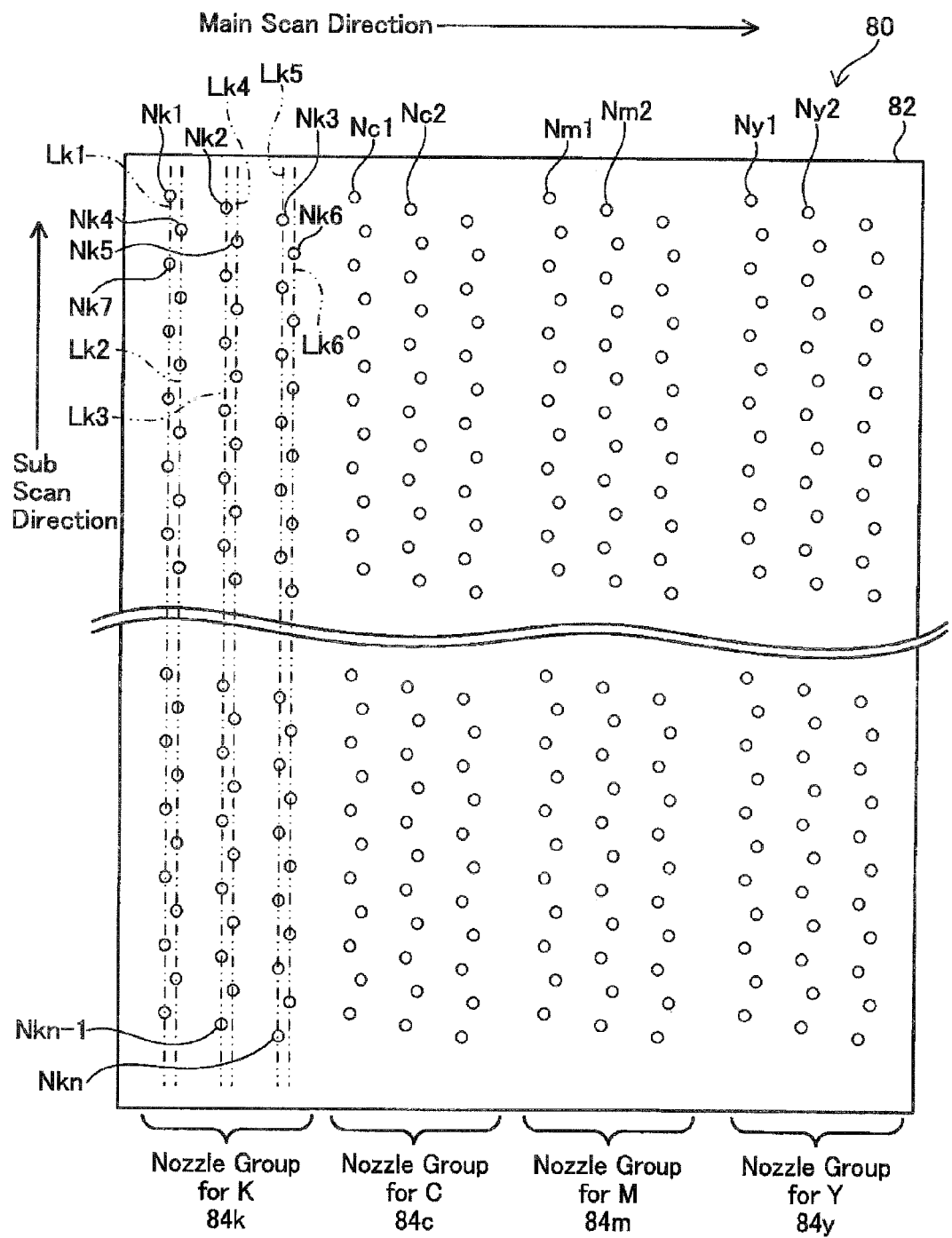
FIG. 2 shows a plan view of a nozzle face of a print head.

As shown in FIG. 2, the print head 80 comprises a nozzle face 82 formed three sets of nozzle groups 84$c$, 84$m$, 84$y$ for discharging ink droplets of three types of chromatic color (cyan, magenta, yellow), and one set of nozzle group 84$k$ for discharging black ink droplets. The nozzle group for K 84$k$ includes n (n is an integer number of two or more) nozzles for K. The nozzle group for K 84$k$ forms six nozzle rows Lk1 to Lk6 extending in the sub scan direction. The n nozzles for K of the nozzle group for K 84$k$ belong to one of the six nozzle rows Lk1, etc. For Example, the nozzles for K Nk1, Nk7, etc. belong to the nozzle row Lk1, the nozzle for K Nk4, etc. belongs to the nozzle row Lk7, and the nozzle for K Nk2, etc. belongs to the nozzle row Lk3. Between two adjacent nozzles for K belonging to one nozzle row (e.g., the nozzle for K Nk1 and the nozzle for K Nk7 belonging to the nozzle row Lk1), five nozzles for K (e.g., NK2 to NK6) belonging to the other five nozzle rows are positioned in the sub scan direction. In the present specification, in the nozzle group for K 84$k$, "Nk1" has been adopted as the reference number of the nozzle for K present at the most downstream side (the upper side in FIG. 2) of the sub scan direction, and the reference number of the nozzles for K increases (e.g., Nk2, Nk3 . . . ) the more it approaches the upstream side (the lower side in FIG. 2) of the sub scan direction.

The nozzle groups 84$c$, etc. corresponding to the other colors each have a configuration identical to that of the nozzle group for K 84$k$. Consequently, 4n nozzles in total are formed in the nozzle face 82. Below, all the nozzles that discharge the four colors of ink droplets CMYK are termed "4n nozzles." The reference numbers are set for the other color nozzle groups 84$c$, etc. as in the case of the nozzle group for K 84$k$. Since the four nozzle groups 84$k$, etc. have the same configuration, the four nozzles corresponding to the four colors CMYK are disposed in the same position in the sub scan direction. For Example, in the sub scan direction, the four nozzles Nk1, Nc1, Nm1, Ny1 are disposed in the same position, and the four nozzles Nk2, Nc2, Nm2, Ny2 are disposed in the same position.

The storing unit 56 stores a characteristic data table 60, a threshold table 62 and the program 64. The program 64 includes a program for the print performing unit 70 to perform print. As shown in FIG. 3, for each of the 4n nozzles formed in the print head 80, an association of nozzle number of the nozzle and characteristic data related to the discharging amount of the ink droplet discharged from the nozzle is registered in the characteristic data table 60. In the characteristic data table 60 of FIG. 3, the reference number of the nozzle (Nk1, etc. of FIG. 2) is adopted as the nozzle number of the nozzle. For example, the characteristic data "36" corresponding to the nozzle number Nk1 shows the characteristic data of the nozzle for K Nk1 (referring to FIG. 2) for discharging black ink droplet. The characteristic data registered in the characteristic data table 60 is examined beforehand by the manufacturer of the printer 50. Specifically, the characteristic data has been examined by the following method.

Although not shown, the print head 80 comprises an actuator unit for discharging ink droplets from the 4n nozzles. The actuator unit comprises 4n individual electrodes corresponding to the 4n nozzles. When the driving signal is supplied to the individual electrode, one ink droplet is discharged from the nozzle corresponding to the individual electrode. The manufacturer of the printer 50 supplies one driving signal to each of the n individual electrodes corresponding to the n nozzles for K belonging to the nozzle group for K 84k. Moreover, the n driving signals supplied here are identical signals. When the n driving signals are supplied, n black ink droplets are discharged from the n nozzles for K toward a predetermined medium. Consequently, n black dots corresponding to the n nozzles for K are formed on the predetermined medium.

For each of the n black dots, the manufacturer measures the density of the dot (e.g., the concentration of black per unit area). The manufacturer determines that, in the nozzle group for K 84k, the density of a specific black dot with lowest density has the greatest value "255" of the 256 tone levels. Next, the manufacturer specifies the density of the other dots formed by the nozzles for K using the density of the specific black dot having the lowest density as a standard thereof. Consequently, the density of the dots formed by the other nozzles for K is specified as a value equal to or above 255. Next, the manufacturer determines characteristic data of the nozzles for K based on the difference between the density of the dots formed by the nozzles for K, and the density of the specific black dot with the lowest density (i.e. 255). Consequently, in the present embodiment, the characteristic data of the nozzle for K that forms the specific dot having the lowest density is determined to be zero. The characteristic data of the other nozzles for K is determined to have a value of zero or more. For example, the characteristic data corresponding to the nozzle number Nk1 shown in FIG. 3 is "36." This means that the difference is "36" between the density of the dot (291) formed by the nozzle for K Nk1, and the density of the specific dot (255) having the lowest density. The manufacturer also determines the characteristic data of each nozzle for cyan, magenta, and yellow in the same manner as for black. For example, the manufacturer determines that, in the nozzle group for C 84c, a specific dot having the lowest density formed by a specific nozzle for C has the characteristic data zero. Further, the manufacturer determines characteristic data of the other nozzles for C based on the difference between the density of the cyan dots formed by the other nozzles for C and the density of the aforementioned specific dot. The manufacturer generates the characteristic data table 60 based on the examination results, and stores the characteristic data table 60 in the storing unit 56. The printer 50 is already storing the characteristic data table 60 at the shipment stage.

As shown in FIG. 4, in the threshold table 62, an association of data type, a coverage and a threshold (to be described) is registered. The manufacturer generates the threshold table 62 and stores the threshold table 62 in the storing unit 56. The printer 50 is already storing the threshold table 62 at the shipment stage.

(Print Mode)

Next, a print mode by which the print performing unit 70 of the printer 50 can be operated will be described. The image process unit 32 (referring to FIG. 1) of the PC 10 performs a binary data generating process (referring to FIG. 7; to be described) so as to generate binary data. The binary data generating process includes an image data conversion process (referring to FIG. 9) and a halftone process (referring to FIG. 13). In a case of being printed with a relatively low first print resolution (e.g., 300 dpi; which is a case where "High Fineness" has not been designated (to be described)), the image process unit 32 generates binary data corresponding to a first print resolution. In present embodiment, print with the first print resolution is performed a single scan print and singling (to be described). In a case of being printed by the single scan print (a case where "Clear" has not been designated (to be described)), the supplying unit of the PC 10 sends, to the printer 50, the binary data for performing print with the first print resolution by the single scan print and mode information designated a first print mode. Further, in a case of being printed by a multiple scan print (a case where "Clear" has been designated (to be described)), the supplying unit 48 sends, to the printer 50, the binary data for performing print with the first print resolution by the singling and mode information designated a third print mode. By contrast, in a case of being printed with a relatively high second print resolution (e.g., 600 dpi; which is a case where "High Fineness" has been designated (to be described)), the image process unit 32 of the PC 10 generates binary data corresponding to the second print resolution. In present embodiment, a print with the second print resolution is performed by an interlaced print (to be described). In this case, the supplying unit 48 sends, to the printer 50, the binary data for performing print with the second print resolution by the interlaced print and mode information designated a second print mode. If the binary data and the mode information are supplied from the PC 10, the print performing unit 70 of the printer 50 operates in one print mode from the first to third print modes in accordance with the mode information.

(First Print Mode)

Figure 5:
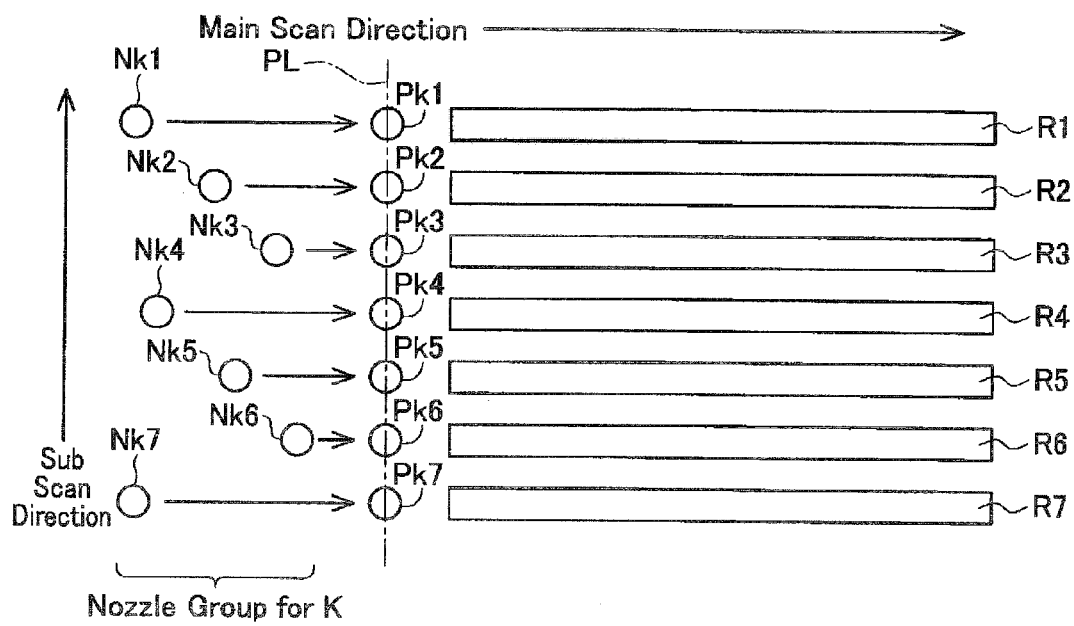
FIG. 5 shows a raster group formed in a first print mode.

In a case where a projection line PL extending in the sub scan direction is set, Pk1, Pk2, etc. shown in FIG. 5 show projection points obtained by projecting, in the main scan direction, the nozzles for K Nk1, Nk2, etc. that constitute the nozzle group for K 84k. Based on the binary data, the print performing unit 70 discharges ink droplets from the nozzles for K Nk1, etc. during one main scan of the print head 80. Consequently, for example, a plurality of black dots aligned in the main scan direction are formed on the print medium by a plurality of black ink droplets discharged from the nozzle for K Nk1. Similarly, another plurality of black dots aligned in the main scan direction are formed on the print medium by a plurality of black ink droplets discharged from the nozzle for K Nk2. In the case of black and white printing, an alignment of a plurality of black dots formed by one nozzle for K in one main scan of the print head 80 is termed "one raster." Consequently, each raster extends along the main scan direction. In the case of black and white printing, e.g., seven nozzles for K Nk1 to Nk7 form seven rasters R1 to R7 in one main scan of the print head 80, respectively.

As described above, for example, the nozzle Nk1, nozzle Nc1, nozzle Nm1, and nozzle Ny1 are disposed in the same position in the sub scan direction (referring to FIG. 2). Consequently, in the case of color printing, the four nozzles Nk1, Nc1, Nm1, Ny1 form a dot in the same position in the sub scan direction in one main scan of the print head 80. Consequently, in the case of color printing, an alignment of a plurality of CMYK dots formed by the four nozzles Nk1, Nc1, Nm1, Ny1 in one main scan of the print head 80 is termed "one raster."

In the first print mode, n rasters are formed along the sub scan direction during the first main scan of the print head 80. When the first main scan of the print head 80 ends, the print performing unit 70 transports the print medium. In the first print mode, a first distance is adopted as the transportation distance. The first distance is the distance of n nozzle pitches. One nozzle pitch is the distance between two adjacent nozzles (e.g., Nk1 and Nk2) in the sub scan direction. That is, one nozzle pitch is the distance between two adjacent projection points (e.g., Pk1 and Pk2). Next, the print performing unit 70 performs a second main scan of the print head 80. N rasters are thereby newly formed. The print performing unit 70 repeats a combination of transporting the print medium by the first distance and performing the main scan of the print head 80. An image represented by the binary data is thereby printed on the print medium.

As is clear from the above description, in the first print mode, the distance between two adjacent rasters is approximately one nozzle pitch. The aforementioned first print resolution refers to the print resolution in the sub scan direction. That is, the first print resolution can also be expressed as "a print resolution that the distance between two adjacent rasters is approximately one nozzle pitch." Moreover, a print corresponding to the first print mode may be termed "single scan print".

(Second Print Mode)

Figure 6:
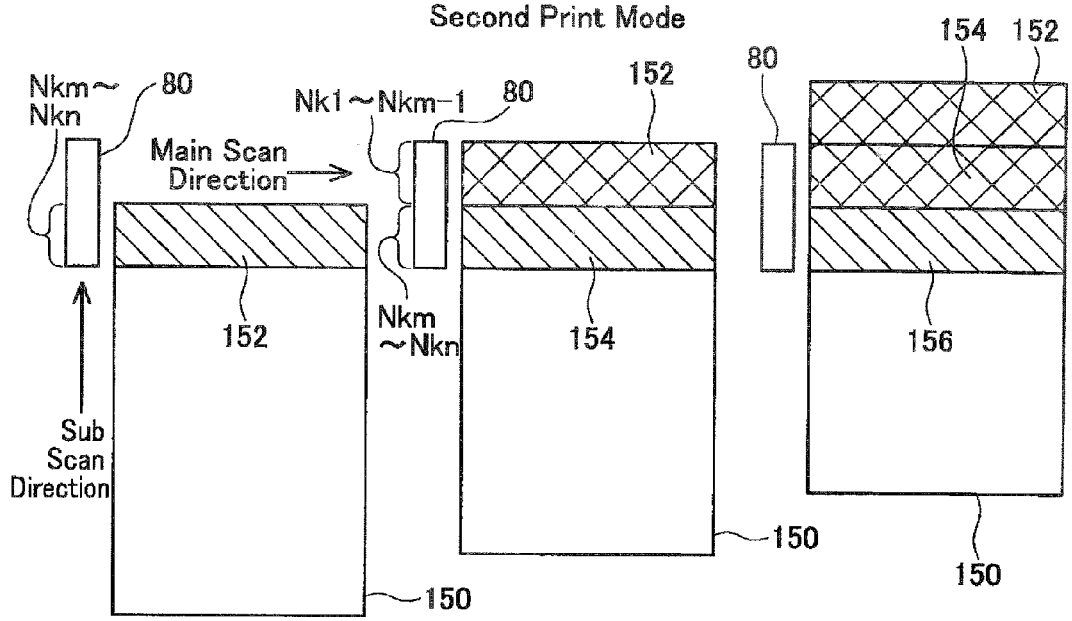
FIG. 6 shows how a print medium is transported in a second print mode.

The second print mode will be described using the case of black and white printing as an example. As shown in FIG. 6, in the second print mode, the print performing unit 70 first performs the first main scan of the print head 80 to perform print on a part 152 of a print medium 150. The part 152 is a part of the print medium 150 positioned at the most downstream side in the sub scan direction. For example, if n is an odd number, in the first main scan, the (n+1)/2 nozzles for K Nkm to Nkn present at the upstream side in the sub scan direction (the lower side of FIG. 6) from among the n nozzles for K Nk1, etc. form (n+1)/2 rasters on the part 152. The aforementioned "m" is (n+1)/2. FIG. 7 shows how eight nozzles for K Nkm to Nkm+7 (FIG. 7 shows the projection points Pkm to Pkm+7) of the (n+1)/2 nozzles for K Nkm to Nkn form eight rasters Rm to Rm+7 in the first main scan.

Next, the print performing unit 70 transports the print medium 150. In the second print mode, a second distance is adopted as the transportation distance. For Example, if n is an odd number, the second distance is the distance n/2 nozzle pitches. As shown in FIG. 7, when this transportation is performed, each of (n−1)/2 nozzles for K Nk1 to Nkm−1 present at the downstream side in the sub scan direction (the upper side of FIG. 6) is positioned between two adjacent rasters (e.g., Rkm and Rkm+1) formed by the first main scan. In this state, the print performing unit 70 performs the second main scan of the print head 80. Each of the (n−1)/2 nozzles for K Nk1 to Nkm−1 thereby forms one new raster between two adjacent rasters formed by the first main scan on the part 152 of the print medium 150. FIG. 7 shows how seven nozzles for K Nk1 to Nk7 (FIG. 7 shows the projection points Pk1 to Pk7) of the (n−1)/2 nozzles for K Nk1 to Nkm−1 form seven rasters R1 to R7 in the second main scan. Further, in the second main scan, the (n+1)/2 nozzles for K Nkm to Nkn present at the upstream side in the sub scan direction (the lower side of FIG. 6) form (n+1)/2 rasters on a part 154 (see the center of FIG. 6) of the print medium 150. The part 154 is adjacent to the part 152, and is positioned upstream from the part 152 in the sub scan direction.

The print performing unit 70 repeats a combination of transporting the print medium 150 by the second distance and performing the main scan of the print head 80. For example, in a third main scan, each of the (n−1)/2 nozzles for K Nk1 to Nkm−1 thereby forms one raster between two adjacent rasters formed by the second main scan on the part 154 of the print medium 150. Further, in the third main scan, the (n+1)/2 nozzles for K Nkm to Nkn form (n+1)/2 rasters on a part 156 (rightmost in FIG. 5) of the print medium 150. The part 156 is adjacent to the part 154, and is positioned upstream from the part 154 in the sub scan direction. The print performing unit 70 repeats the combination of transporting the print medium by the second distance and performing the main scan of the print head 80. An image represented by the binary data is thereby printed on the print medium. Moreover, except for the use of the other color nozzle groups 84c, etc., the second print mode in the case of color printing is identical to the case of black and white printing.

As is clear from the above description, in the second print mode, the distance between two adjacent rasters is approximately ½ nozzle pitch. The second print resolution is two times the first print resolution in the sub scan direction. The second print resolution can also be expressed as "a print resolution that the distance between two adjacent rasters is approximately ½ nozzle pitch." Moreover, a print corresponding to the second print mode may be termed "interlaced print".

(Third Print Mode)

Next, the third print mode will be described. Moreover, a print corresponding to the third print mode may be termed "singling". Moreover, singling can also be called an "overlap method."

The singling of black and white print of the present embodiment will be described with reference to FIG. 8. Moreover, in a case of color printing, singling is performed as with the case of black and white printing, but using the other color nozzle groups 84c, etc. in addition to the nozzle group for K 84k. In both the first print mode and second print mode, one nozzle for K forms one raster by one main scan of the print head 80. By contrast, in the singling, two nozzles for K form one raster by two main scans of the print head 80. For example, as shown in FIG. 8, in the first main scan of the print head 80, the nozzle for K Nkm+3 (Pkm+3) forms a dot group Dkm+3. Next, in the second main scan of the print head 80, the nozzle for K Nk4 (Pk4) forms a dot group Dk4. One raster R4 is composed from the dot group Dkm+3 and the dot group Dk4. As is clear from the above description, in the first main scan, the dot group Dkm+3 is formed in accordance with a first pixel group equivalent to half of a plurality of pixels that constitutes a specific line of the binary data and, in the second main scan, the dot group Dk4 is formed in accordance with a remaining second pixel group that constitutes the specific line. In the specific line of the binary data, the first pixel group and the second pixel group are positioned alternately. That is, each pixel of the first pixel group is, e.g., a pixel belonging to an even number row, and each pixel of the second pixel group is, e.g., a pixel belonging to an odd number row.

For example, when n is an odd number, in the singling, one nozzle for K Nkn disposed at the most upstream side in the sub scan direction is not used. In the first main scan, each of (n−1)/2 nozzles for K Nkm to Nkn−1 form the first dot group (see the dot Dkm+3 of FIG. 8). Next, the print performing unit 70 transports the print medium 150. In the singling, a third distance is adopted as the transportation distance. The third distance is the distance (n−1)/2 nozzle pitches. When this transportation is performed, as shown in FIG. 8, each of the (n−1)/2 nozzles for K Nk1 to Nkm−1 disposed at the downstream side are disposed at the same position as the first dot group in the sub scan direction. For example, the nozzle for K Nk4 (Pk4) is disposed in the same position as the dot Dkm+3. In this state, the print performing unit 70 performs the second main scan of the print head 80. Each of the (n−1)/2 nozzles for K Nk1 to Nkm−1 disposed downstream thereby forms a second dot group (see the dot Dk4 of FIG. 8). An (n−1)/2 raster R1, etc. is constituted by the first dot group and the second dot group. Moreover, in the second main scan, the (n−1)/2 nozzles for K Nkm to Nkn−1 disposed at the upstream side also form a dot group. The print performing unit 70 repeats the combination of transporting the print medium 150 the third distance and the main scan of the print head 80. An image represented by the binary data is thereby printed on the print medium 150.

As is clear from the above description, the print resolution of the singling in the sub scan direction is the same as the first print resolution of the first print mode. However, the print results of singling have a higher image quality than the print results of the first print mode. For example, since one nozzle forms one raster in the first print mode, a difference in the discharging amount of each nozzle appears noticeably as a density difference of each raster. By contrast, in singling, since two nozzles form one raster, a difference in the discharging amount of each nozzle does not readily appear as a density difference of each raster.

(Image Data Conversion Process of PC 10)

Figure 10:
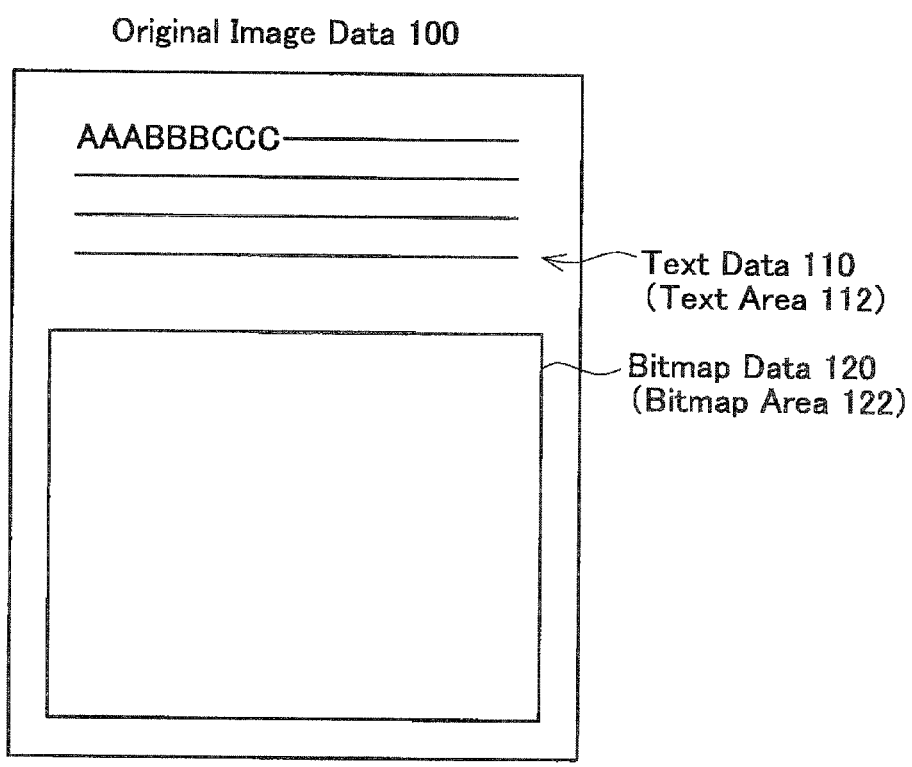
FIG. 10 shows a configuration of original image data

Next, an image data conversion process performed by the controlling unit 30 of the PC 10 will be described. The user can select desired data, and perform an operation on the operating unit 12 for printing an image represented by the data. One example of original image data 100 selected by the user is shown in FIG. 10. The original image data 100 includes text data 110 and bitmap data 120. For example, the original data 100 is acquired by the bitmap data 120 such as a picture etc. is attached within a data file that a text is described with a text format. In the present embodiment, all parts except for a part of the bitmap data 120 of the original image data 100 are the text data 110. Below, an area corresponding to the text data 110 of an entire area of an image represented by the original image data 100 may be termed "a text area 112". Further, an area corresponding to the bitmap data 120 of the entire area may be termed "a bitmap area 122" below.

If the above operation is performed, the controlling unit 30 causes the displaying unit 14 to display options that the user may select. Four type of character strings "High Fineness", "Clear", "Fast" and "No Selected" is displayed on the displaying unit 14. The user may perform an option designating operation for designating one type of the character string from the four character string types. When the option designating operation is performed by the user, the controlling unit 30 performs the image data conversion process of FIG. 9 in accordance with the printer driver 24.

The image process unit 32 (referring to FIG. 1) acquires the original image data 100, and stores the original image data 100 in the work area 22 (S10). Next, the selecting unit 36 (referring to FIG. 1) determines whether or not "High Fineness" is designated by the option designating operation (S12). If YES in 812, the process proceeds to S18. If NO in S12, the process proceeds to S14. In S14, the selecting unit 36 determines whether or not "Clear" is designated by the option designating operation. If YES in S14, the process proceeds to S18. If NO in S14, the process proceeds to S16. In S16, the selecting unit 36 determines whether or not "Fast" is designated by the option designating operation. If YES in S16, the process proceeds to S18. If NO in S16, the process proceeds to S20.

In S18, using a known technique, the image process unit 32 converts all of the original data 100 to a bitmap data described by RGB format. Moreover, if the all of the original data 100 is constituted by the bitmap data described by the RGB format, the conversion is not performed. Further, using a known technique, the image process unit 32 performs a resolution conversion process on the RGB image data so as to generate converted ROB image data. In the resolution conversion process, the image process unit 32 converts the RGB image data to the resolution corresponding to the option designating operation. That is, if "High Fineness" is not designated by the user, the converted RGB image data corresponding to the first print resolution is generated. If "High Fineness" is designated by the user, the converted RGB image data corresponding to the second print resolution is generated. Converted ROB image data 200 shown in FIG. 11 is obtained by the resolution conversion process. The pixels 201, 202, 206, 207, etc. within the converted RGB image data 200 comprise an R value (e.g., R (i, j)), a G value (e.g., G (i, j)), and a B value (e.g., B (i, j)). The R value, G value, and B value are each 256 tone (0 to 255) multi-value data. Moreover, of coordinates indicated within the pixels, an x coordinate indicates a row number of each pixel, and a y coordinate indicates a line number of each pixel.

Upon ending S18, the selecting unit 36 selects the second process mode (S19). I.e., in S19, the selecting unit 36 stores information for specifying all pixel groups within the converted RGB image data 200 (e.g., a row number and a line number of each pixel) and information indicated the second process mode in the work area 22. Below, the information for specifying all pixel groups within the converted RGB image data 200 may be termed "all pixels specifying information". Upon ending S19, the process proceeds to a color conversion process of S44.

In S20, the controlling unit 30 sends a predetermined command to the printer 50 for acquiring the characteristic data table 60 and the threshold table 62 stored in the printer 50. The printer 50 sends, in accordance with the predetermined command, the characteristic data table 60 and the threshold table 62 stored in the storing unit 56 to the PC 10. Consequently, the controlling unit 30 acquires the characteristic data table 60 and the threshold table 62. The controlling unit 30 stores the characteristic data table 60 and the threshold table 62 in the work area 22.

Next, the type discriminating unit 41 discriminates an original image data type (S22). First, the type discriminating unit 41 analyzes a data configuration of the original image data 100 so as to discriminate the original image data type. The original image data type is one of the followings: character data constituted by text data only, pattern data constituted by the bitmap data only or combined data constituted by both the text data and the bitmap data. In a case where the original data is the character data, the type discriminating unit 41 discriminates that the original data 100 is the text data.

Further, in a case where the original data is the image data, the type discriminating unit 41 calculates an evaluating value based on the each pixel value included in the original image data 100 (i.e., the bitmap data). The type discriminating unit 41 calculates the evaluating value using the bitmap data described by RGB. Moreover, in a case where the bitmap data of the original image data 100 is described by CMYK, the type discriminating unit 41 converts the bitmap data described by CMYK to the bitmap data described by RGB. The evaluating value is an average value of a minimum value of three values (an R value, a G value, a B value) constituting the each pixel included in the bitmap data described by RGB. For example, in a case where the bitmap data constitutes only two pixels and, a minimum value of the three value constituting one pixel is an R value and a minimum value of the three value constituting the other pixel is a G value, the evaluating value of the bitmap data is an average value of the R value and G value. The evaluating value of the bitmap data is a value regarding a density of the bitmap data. The evaluating value of the bitmap data may also be called a value regarding an amount of ink to be used. The type discriminating unit 41 discriminates that the original image data 100 is any of low density to high density bitmap data of the threshold table 62 based on the calculated evaluated value and the coverage of the threshold table 62 (referring to FIG. 4) acquired in S20.

Further, in a case where the original data is the combined data as shown in FIG. 10, the type discriminating unit 41 performs a process below. The type discriminating unit 41 specifies entire area of the image represented by the original image data 100 based on a horizontal and vertical size of the image represented by the original image data 100. Moreover, the type discriminating unit 41 specifies the entire area by entire coordinate group. Further, the type discriminating unit 41 specifies the bitmap area 122 corresponding to the bitmap data 120. Moreover, the type discriminating unit 41 specifies the bitmap area 122a by a bitmap coordinate group. Further, the type discriminating unit 41 specifies, from the entire area, an area except for the bitmap area 122 as the text area 112. Moreover, the type discriminating unit 41 specifies the text area 112 by a text coordinate group. The type discriminating unit 41 calculates an evaluate value based on a pixel value of each pixel included in the bitmap data 120. Next, the type discriminating unit 41 discriminates that the bitmap data 120 is any of the low density to high density bitmap data on the threshold table 62 based on the calculated evaluating value and the coverage of the threshold table 62 (referring to FIG. 4) acquired in S20. Further, the type discriminating unit 41 discriminates text data to the text area 112.

The threshold table 62 will be described. As shown in FIG. 4, a combination of the data type, the coverage and the threshold is recorded in the threshold table 62. "Data Type" is classified in the text data and the bitmap data. The text data means data described by text format. The coverage is not set and the threshold is set "30" to the text data. "Threshold" is a threshold for selecting one process mode from the first and second process mode and is determined in S30 of FIG. 9. The bitmap data is classified in three bitmap data types. Particularly, the bitmap data type is determined corresponding to the evaluating value determining based to each pixel value included in the bitmap data belongs to any of three coverage shown in FIG. 4. For example, in a case where the evaluating value of the bitmap data belongs to "0 to 84", the bitmap data is the high density bitmap data. I.e., as is clear from FIG. 4, the threshold table 62 is set such that the greater is a value regarding a density of bitmap data (evaluating value), the less is the threshold. Further, the threshold table 62 is set such that the threshold of the text data is greater than the three threshold of the bitmap data. Moreover, details will be described, the less is the threshold, the easier is the first process mode. In another embodiment, the type discriminating unit 41 may discriminate bitmap data type using bitmap data described by CMYK. In this case, the evaluating value of the bitmap data may be a sum of four values (C value, M value, Y value, K value) constituting each pixel included in the bitmap data.

In S24, the image process unit 32 performs a resolution conversion process similar to the process in S18. Below, a process in S24 will be described each of in a case where only the text data has been discriminated in S22, in a case where only the bitmap data has been discriminated in S22 and in a case where the both text data and the bitmap data have been discriminated in S22. In the case where only the text data has been discriminated in S22 (the original data 100 is the character data), the image process unit 32 stores a combination of the all pixels specifying information and information indicating the text data in S24. In the case where only the bitmap data has been discriminated in S22 (the original data 100 is the pattern data), the image process unit 32 stores a combination of the all pixel specifying information and information indicating a discriminated bitmap data type in S24. In the case where the both text data and the bitmap data have been discriminated in S22 (the original data 100 is the combined data), the image process unit 32 performs a process below in S24. As above mentioned, the all coordinate group is a coordinate group for specifying the entire area of the image represented by the original image data 100 and the bitmap coordinate group is a coordinate group for specifying the second are 122. Therefore, based on the all coordinate group and the bitmap coordinate group, the image process unit 32 can finds a relative positional relationship of the bitmap area 122 corresponding to the entire of the image represented by the original image data 100. Based on the relative positional relationship, the image process unit 32 specifies a pixel group corresponding to the bitmap area 122 from the all pixels constituting the converted RGB image data 200. A residual pixel group except for the pixel group corresponding to the bitmap area 122 means a pixel group corresponding to the text area 112. The image process unit 32 stores a combination of the information for specifying the pixel group corresponding to the text area 112 (e.g., a row number and line number of each pixel) and information indicating the text data in the work area 22. Further, the image process unit 32 stores a combination of the information for specifying the pixel group corresponding to the bitmap area 122 (e.g., a row number and line number of each pixel) and information indicating the bitmap data type discriminated in S22 in the work area 22.

In S28, the threshold determining unit 40 specifies a pixel group included in one area and a data type of data corresponding to the area. For example, in a case where the all pixel specifying information and the information indicating the text data are stored in the work area 22 in S24, the threshold determining unit 40 performs the process in S28 by specifying these information. Similarly, for example, in a case where the all pixel specifying information and the information indicating the bitmap data type discriminated in S22 are stored in the work area 22 in S24, the threshold determining unit 40 performs the process in S28 by specifying these information. That is, in these cases, the all image represented by the original data 100 is treated as one area. Further, for example, in a case where the information indicating the text data and the information indicating the bitmap data type are stored in work area 22 in S24, the threshold determining unit 40 performs the process in S28 by specifying the information for specifying the pixel group corresponding to the one area (e.g., the text area 112) and the information indicating the data type of data corresponding to the area. Moreover, in this case, in second process in S28 performed later, the threshold determining unit 40 performs the process in S28 by specifying the information for specifying the pixel group corresponding to a residual one area (e.g., the bitmap area 122) and the information indicating the data type of data corresponding to the area.

Next, the threshold determining unit 40 determines a threshold for the pixel group specified in S28 (i.e., one area) based on the threshold table 62 (S30). For example, in a case where the text data has been specified in S28, the threshold determining unit 40 determines "30" as the threshold. Further, for example, in a case where the low density bitmap data has been specified in S28, the threshold determining unit 40 determines "20" as the threshold.

Next, the image process unit 32 acquires n sets of the characteristic data corresponding to a specific color (e.g., K) of the four color type from the characteristic data table 60 stored in work area 22. The deciding unit 38 (referring to FIG. 1) specifies a maximum value and a minimum value from the n sets of the characteristic data specified in S32. Next, the deciding unit 38 compares a difference between the maximum value and the minimum value (i.e., the difference is equal to the specified maximum value) to the threshold determined in S30 (S34). In this case, the difference between the maximum value and the minimum value is one example of an "index value related to variability of a plurality of characteristic data". In another embodiment, the deciding unit 38 may compare a standard deviation of the n sets of the characteristic data specified in S32. In this case, the standard deviation of the characteristic data is one example of the "index value related to variability of a plurality of characteristic data". In a case where the difference is greater than the threshold, the deciding unit 38 decides YES in S34 and the process proceeds to S36. In a case where the difference is equal or less than the threshold, the deciding unit 38 decides NO in 534 and the process proceeds to S38. In S36, the selecting unit 36 selects the first process mode. Further, in S38, the selecting unit 36 selects the second process mode. Upon ending S36 or S38, the process proceeds to S40.

In S40, the image process unit 32 determines whether or not processes of S32 to 38 are completed for all colors of CMYK. In a case of NO in 540, the process returns to S32 and the processes of S32 to S38 is performed for one type of a specific color from color types that the processes of S32 to S38 have not been completed yet. When the processes of S32 to 38 are completed for all colors of CMYK, YES in S40 is determined. In this case, the image process unit 32 determines whether or not processes of S28 to S40 are completed for the all areas (S42). For example, the original image data 100 is constituted by only the text data or only the bitmap data, YES in first process of S42 is determined because the original image data 100 includes only one area. Further, for example, in a case where the original image data 100 includes the text area 112 and the bitmap area 122 and the pixel group corresponding to the text area 112 have been specified in first process of S28, NO in the first process of S42 is determined. In this case, the process returns to S28, and the pixel group corresponding to the bitmap area 122 is specified. In a case where YES in S42, the process proceeds to S44.

As is clear from the above description, in a case where processes S28 to S42 have been performed, the process mode is selected for each of CMYK of the pixel group corresponding to the each of areas constituting the image represented by the original image data 100 and Moreover, for example, in a case where the pixel group corresponding to the one area in S28 is specified, the processes of S30 to S38 are performed for each of 4 colors of CMYK. Therefore, different process modes may be selected to different color in the same area. I.e., for example, in a case where the first process mode is selected for K of a pixel group corresponding to the first area 112, the second process mode is selected for C of the pixel group corresponding to the first area 112.

In S44, the color conversion process unit 34 (referring to FIG. 1) performs a color conversion process using a known technique. The color conversion process unit 34 converts the converted RGB image data 200 to CMYK bitmap format image data (termed "CMYK image data" below). CMYK image data 210 in FIG. 12 is obtained by the color conversion process. One pixel (e.g., pixel 211) written in CMYK format is obtained from one pixel (e.g., pixel 201) within the converted RGB image data 200. Consequently, a number of pixels of the CMYK image data 210 is identical to a number of pixels of the converted RGB image data 200. The pixels 211, 212, 216, 217, etc. within the CMYK image data 210 comprises a C value (e.g., C (i, j)), an M value (e.g., M (i, j)), a Y value (e.g., Y (i, j)), and a K value (e.g., K (i, j)). The C value, M value, Y value, and K value are each 256 tone (0 to 255) multi-value data. Further, of coordinates indicated within the pixels, an x coordinate indicates a row number of each pixel, and a y coordinate indicates a line number of each pixel.

Next, the halftone process unit 42, etc. (referring to FIG. 1) performs a halftone process using the CMYK image data 210. The halftone process includes the processes S52 to S80 in FIG. 13. First, the correcting unit 43 (referring to FIG. 1) specifies one pixel within the CMYK image data 210 (S52). The sequence for specifying one pixel in S52 is predetermined. Specifically, in a first process of S52, the correcting unit 43 specifies, from among the CMYK image data 210, one pixel belonging to a leftmost row from among a plurality of pixels belonging to the topmost line of FIG. 12. In a second process and subsequent processes of S52, the correcting unit 43 specifies one pixel belonging to the same line as the pixel specified previously (termed "previous specific pixel" below) and belonging to a row neighboring the previous specific pixel to the right. Moreover, when the previous specific pixel belongs to a rightmost row, the correcting unit 43 specifies one pixel belonging to a leftmost row, from among a plurality of pixels belonging to a line one below that of the previous specific pixel.

Figure 14:
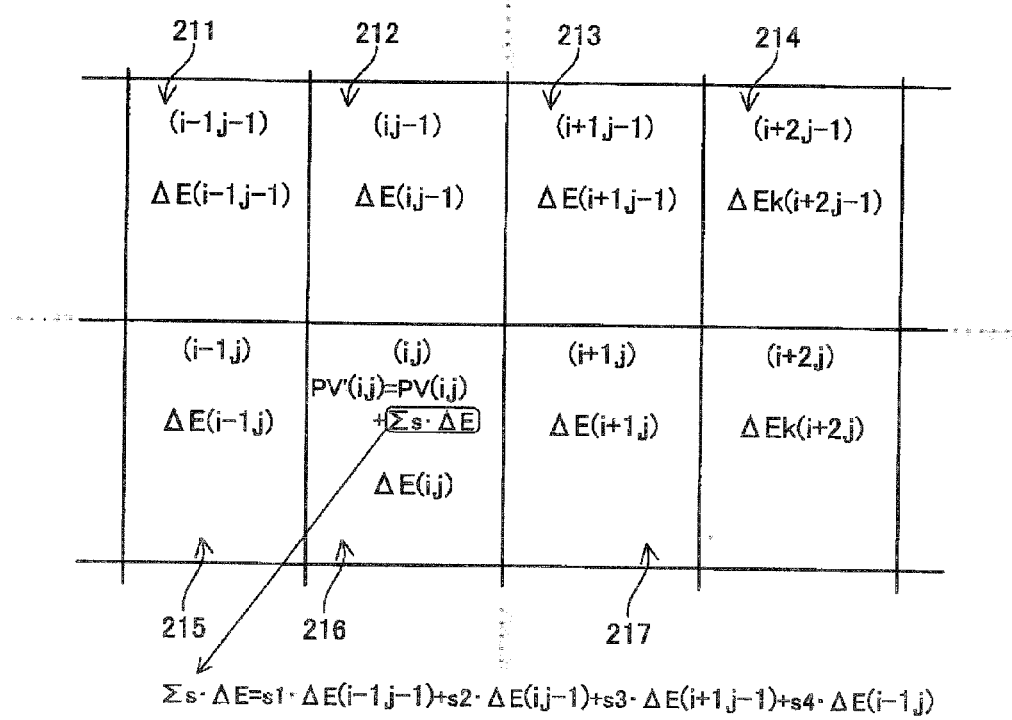
FIG. 14 shows error values of pixels within the CMYK image data

Below, the one pixel specified in S52 is termed a "target pixel." The correcting unit 43 specifies one value (e.g., the K value) from among the four values CMYK constituting the target pixel (S54). Below, the one value specified in S54 is termed "PV (Pixel Value)." Next, the correcting unit 43 corrects the PV specified in S54 (S56). Specifically, the correcting unit 43 corrects the PV of the target pixel using a plurality of error values calculated for a plurality of neighbor pixels positioned neighboring the target pixel from among the processed pixel group for which the processes S58 to S76 have been completed before those of the target pixel. For example, if the target pixel is the pixel 216 of FIG. 14, the processes S58 to S76 have been completed for the pixels 211 to 215. Consequently, four error values corresponding to CMYK are calculated for each of the pixels 211 to 215 in S70 to S74 (to be described). For example, for the pixel 211, an error value corresponding to C, an error value corresponding to M, an error value corresponding to Y, and an error value corresponding to K have been calculated. Moreover, in FIG. 14, for convenience, the four error values corresponding to the four colors CMYK are not differentiated, but are represented as "ΔE" Moreover, below, e.g., an error value corresponding to K may be represented as "ΔEk." In the present embodiment, the four pixels 211, 212, 213, 215 positioned to the upper left, atop, upper right, and left of the target pixel 216 are adopted as the neighbor pixels of the target pixel 216. In another embodiment, the pixel to the left of the target pixel 211, the pixel atop the pixel 212, the pixel 214, and the pixel to the left of the pixel 215, etc. may further be adopted as the neighbor pixels of the target pixel 216.

The correcting unit 43 specifies one error value (e.g., the error value ΔEk (i−1, j−1) corresponding to K) corresponding to the color (e.g., K) of the PV of the current correction object from among the four error values ΔE (i−1, j−1) calculated for the one neighbor pixel 211 from among the four neighbor pixels 211, 212, 213, 215 of the target pixel 216. Similarly, for each of the other three neighbor pixels 212, 213, 215, the correcting unit 43 specifies one error value corresponding to the color of the PV of the current correction object from among the four error values calculated for those neighbor pixels. Consequently, the four error values corresponding to the color of the PV of the current correction object are specified. Next, the correcting unit 43 corrects the PV of the target pixel 216 using the four specified error values according to a formula shown within the pixel 216 of FIG. 10 so as to calculate a corrected pixel value PV'. Moreover, s1, s2, s3, s4 within the formula are predetermined coefficients corresponding to a positional relationship between the target pixel 216 and the neighbor pixels. For example, if the PV (i, j) of the target pixel 216 is the K value (K (i, j)), the correcting unit 43 multiplies the error values ΔEk of the neighbor pixels (e.g., ΔEk (i−1, j−1) of the neighbor pixel 211) by the coefficients corresponding to the neighbor pixels (e.g., s1 corresponding to the neighbor pixel 211) so as to calculate a multiplication value for each of the four neighbor pixels 211, 212, 213, 215. Next, the correcting unit 43 adds the K value (i, j) (i.e., the PV (i, j)) of the target pixel 216 to the four multiplication values calculated for the four neighbor pixels 211, 212, 213, 215 so as to calculate a corrected value K' (i, j) (i.e., the PV' (i, j)).

Next, the determining unit 44 (referring to FIG. 1) determines whether the corrected pixel value PV' (e.g., K' (i, j)) obtained in S56 is greater than a predetermined threshold Th (e.g., 128) (S58). If YES, the determining unit 44 determines to form a dot of the color corresponding to the corrected pixel value PV' of the determined object on the print medium (S60). The value determined here is a dot output value "1" of the color corresponding to the corrected pixel value PV'. For example, if the corrected pixel value PV' of the target pixel 216 is K' (i, j), in S60 the determining unit 44 determines "K=1" as the new pixel value in the same position as the target pixel. When the binary data including this type of information is supplied to the printer 50, a black ink droplet is discharged to a position corresponding to the target pixel 216 on the print medium. Consequently, a black dot is formed at the position corresponding to the target pixel 216 on the print medium.

Next, the halftone process unit 42 determines whether of not the process mode corresponding to the target color (e.g., K) of the target pixel (e.g., the pixel 216) is the first process mode (S64). As described above, in S19, S36 and S38 in FIG. 9, for each of one area, the combination of the information for specifying the pixel group included in the area, the information indicating the color and the information indicating the process mode is stored. The halftone process unit 42 may specify the process mode corresponding to the target color of the target pixel based on the above mentioned information, and determines whether of not the specified process mode is the first process mode. If YES in S64, the process proceeds to S66, and if the NO in S64, the process proceeds to S72.

In S66, the halftone process unit 42 specifies a nozzle number (termed "target nozzle number" or "number of a target nozzle" below) of a nozzle (termed "target nozzle" below) that forms a dot of a color (e.g., K) corresponding to the PV' at a position corresponding to the target pixel (e.g., the pixel 216) on the print medium. Moreover, e.g., if the color corresponding to the PV' is K, the nozzle for K is specified as the target nozzle. Below, a case of the nozzle for K being specified as the target nozzle is termed a "target nozzle for K." Similarly, the case of the nozzle for K being specified as the specific nozzle is termed a "specific nozzle for K." The technique for specifying a number of a target nozzle for K will be described in detail next.

Figure 9:
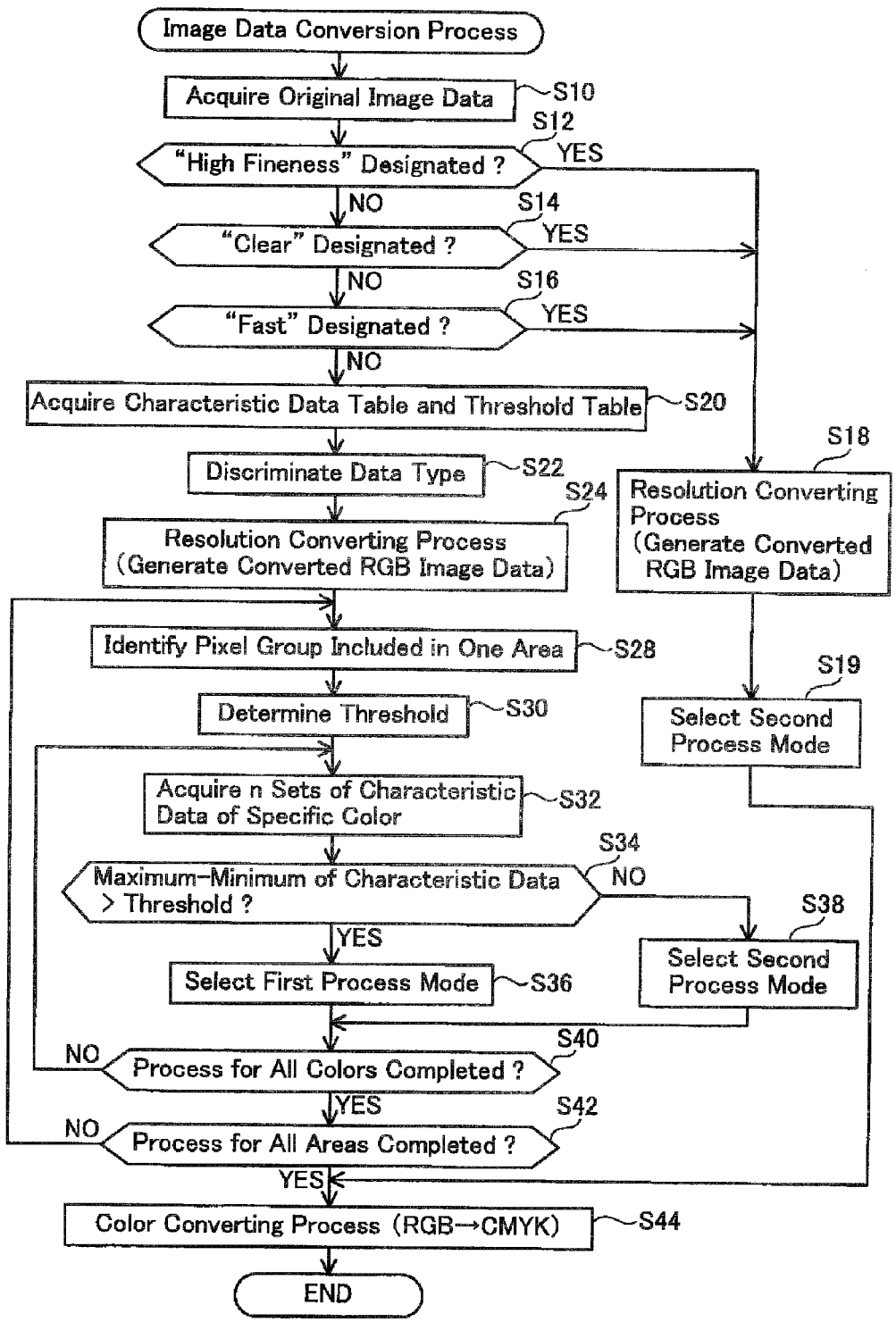
FIG. 9 shows a flowchart of an image data conversion process performed by a PC.

The case where YES is determined in S64 (the process of S66 is performed), i.e., the first process mode is determined in S64 is a case where "High Fineness" and "Clear" is not designated in the option designating operation (NO in S12, S14 of FIG. 9). Consequently, as above mentioned, the first print mode is performed by the printer 50. The first print mode is performed as shown in FIG. 5. I.e., in the first main scan, the nozzles for K Nk1 to Nkn form a raster corresponding to lines 1 to n of the CMYK image data 210 of the first print resolution. Further, the transportation distance of the first print mode (the first distance) is the distance of n nozzle pitches.

Based on above contents, the target nozzle for K that forms rasters corresponding to a line L of the CMYK image data 210 of the first print resolution may be specified. A first number table of nozzles for K for specifying the number of the target nozzle for K from the line number of the pixels of the CMYK image data 210 of the first print resolution has been registered in advance in the printer driver 24 (referring to FIG. 1). In S 66, the halftone process unit 42 specifies the number of the target nozzle for K based on the line number of the target pixel within the CMYK image data 210, and the first number table of nozzles for K.

For each of the three types of chromatic color CMY, a nozzle number table similar to the number table of nozzles for K is registered in advance in the printer driver 24. If the color corresponding to the PV specified in S54 is any of the three types of chromatic color CMY, the halftone process unit 42 specifies the target nozzle number and the specific nozzle number as in the case of K. For example, if the color corresponding to the PV specified in S54 is C, the halftone process unit 42 specifies, using a number table of nozzles for C, a number of one target nozzle for C.

Figure 15:
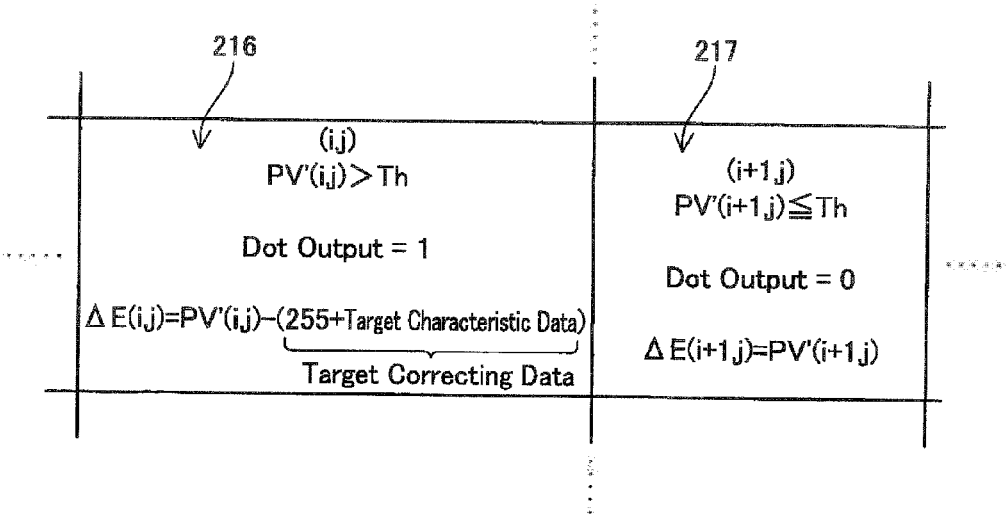
FIG. 15 shows a formula for calculating the error values of pixels within the CMYK image data.

Next, the correction data calculating unit 39 (referring to FIG. 1) calculates correction data (S68). The correction data calculating unit 39 acquires characteristic data corresponding to the target nozzle number specified in S66 (termed "target characteristic data" below) from the characteristic data table 60 stored in the work area 22 in S22 of FIG. 9. Next, the correction data calculating unit 39 adds 255 to the acquired target characteristic data so as to calculate correction data (termed "target correction data" below). Next, the error value calculating unit 45 (referring to FIG. 1) subtracts the target correction data obtained in S68 from the corrected pixel value PV' obtained in S56 so as to calculate an error value ΔE (S70). The formula for calculating the error value in this manner is shown within the pixel 216 of FIG. 15. That is, if the target pixel is the pixel 216 of FIG. 15, the PV' (i, j) obtained in S56 is greater than the threshold Th (YES in S58), and the first process mode is determined (YES in S64), the error value calculating unit 45 subtracts the target correction data from the PV' (i, j) so as to calculate error values ΔE (i, j) corresponding to the pixel 216. For example, if the color corresponding to the PV specified in S54 is K, the error value corresponding to K of the pixel 216 is calculated. Similarly, if the color corresponding to the PV specified in S56 is another color, the error value corresponding to the other color of the pixel 216 is calculated.

In S72, the error value calculating unit 45 subtracts a fixed value ("255" in the present embodiment) from the corrected pixel value PV' obtained in S56 so as to calculate an error value ΔE. For example, if the target pixel is the pixel 216 of FIG. 15, and the PV' (i, j) obtained in S56 is greater than the threshold Th (YES in S58), and the second process mode is determined (NO in S64), the error value calculating unit 45 subtracts the fixed value "255" from the target correction data from the PV' j) so as to calculate error values ΔE (i, j) corresponding to the pixel 216.

In a case of NO in S58, the determining unit 44 determines not to form a dot of the target color corresponding to the corrected pixel value PV' of the determined object on the print medium (S62). The value determined here is a dot output value "0" of the target color corresponding to the corrected pixel value PV'. For example, if the corrected pixel value PV' of the target pixel 216 is K' (i, j), in S62, the determining unit 44 determines "K=0" as the new pixel value in the same position as the target pixel. When the binary data including this type of information is supplied to the printer 50, a black ink droplet is not discharged to a position corresponding to the target pixel 216 on the print medium. Consequently, a black dot is not formed at the position corresponding to the target pixel 216 on the print medium.

Next, the error value calculating unit 45 specifies the corrected pixel value PV' obtained in S56 as the error value. The formula for calculating the error value in this manner is shown within the pixel 217 of FIG. 15. That is, if the target pixel is the pixel 217 of FIG. 15, and the PV' (i, j) obtained in S56 is smaller than the threshold Th (NO in 558), the error value calculating unit 45 specifies error values ΔE (i+1, j) corresponding to the pixel 217 using the formula within the pixel 217 of FIG. 15. The error value calculating unit 45 calculates the error values using the corrected pixel value PV', and without using the target correcting data and the fixed value "255".

Moreover, in a case where the C value, M value and Y value are specified, the process similar to the case where the K value is specified in S54 is performed.

Upon ending S70, S72 or S74, the error value calculating unit 45 stores the error value (e.g., ΔE (i, j)) specified in S70, S72 or S74 in the work area 22 as the error value corresponding to the target pixel (S76). The error value stored here is used in the process S56 which is performed later. For example, if the error value ΔE (i, j) corresponding to K of the pixel 216 was stored in S76, this is used in S56 when calculating K' (i+1, j) corresponding to the K value of the pixel 217.

As above mentioned, in S72, for the case where a dot output value=1, the error value ΔE is calculated using the formula ΔE=PV'–the fixed value "255", and without using the target characteristic data. Here, using the fixed value "255" means that density of each of the 4n dots formed by the 4n nozzles is assumed to be "255." The error value ΔE is calculated as the difference between the value PV' of the target pixel that should actually be expressed and the assumed dot density "255". This difference is diffused to the neighbor pixels by the process S56. Similarly, in S74 for the case where the dot output value=0, the error value ΔE is calculated using the formula ΔE=PV". I.e., the error value ΔE is calculated as the difference between the value PV' of the target pixel that should actually be expressed and the density "0" in the case where a dot is not formed. This difference is diffused to the neighbor pixels by the process S56.

Moreover, in S70, for the case of a dot output value=1, the error value ΔE is calculated using the target characteristic data by the formula ΔE=PV'–target correction data (255+ target characteristic data). Here, the characteristic data corresponding to a node having the minimum discharging amount (termed "minimum characteristic data" below) is "0." Consequently, in a case where the target characteristic data is the minimum characteristic data, the formula is ΔE=PV'–255. This means that the density of a dot formed by the nozzle having the minimum discharging amount is assumed to be "255." That is, using "255+target characteristic data" as the target correction data means that the density of a dot formed by the target nozzle is assumed to be "255+target characteristic data." In S70, the error value ΔE is calculated as the difference between the value PV' of the target pixel that should actually be expressed and the assumed dot density "255+target characteristic data". This difference is diffused to the neighbor pixels by the process S56.

Next, the halftone process unit 42 determines whether the processes S54 to S76 have been performed for all four pixel values CMYK (C value, M value, Y value, K value) that constitute the target pixel (S78). In the case of NO, the halftone process unit 42 returns to S54 and, from among the four values CMYK that constitute the target pixel, specifies the values that have not been performed in the processes S54 to S76. In the case of YES in S78, the halftone process unit 42 determines whether the processes S52 to S78 have been completed for all the pixels constituting the CMYK image data 210 (S80). In the case of NO, the halftone process unit 42 returns to S52, and specifies a pixel following the current target pixel (essentially, the right neighboring pixel) as a new target pixel. In the case of YES in S80, the halftone process ends.

As is clear from the above description, in the halftone process, one new pixel that comprises C=0 or 1, M=0 or 1, Y=0 or 1, and K=0 or 1 is generated from one pixel that constitutes the CMYK image data 210. Consequently, a number of pixels of binary data is equal to the number of pixels of CMYK image data 210. The supplying unit 48 (FIG. 1) sends, to the printer 50, the binary data and mode information showing whether the first to third print mode has been selected. Consequently, the print performing unit 70 of the printer 50 performs the print process in accordance with the binary data. I.e., the print performing unit 70 supplies a driving signal to the individual electrodes corresponding to the nozzles for K for forming a dot so as to form a black dot on the print medium at a position corresponding to the pixel indicating K=1 included in the binary data. Similarly, the print performing unit 70 supplies a driving signal, in accordance with the binary data, to form other color dots. Consequently, an image represented by the RGB image data acquired in S10 of FIG. 9 (i.e., an image represented by the converted RGB image data 200 obtained in S18 or S24, an image represented by the CMYK image data 210 obtained in S44, an image represented by the binary data) is formed on the print medium.

The present embodiment has been described in detail. In the present embodiment, "Clear" is designated by the user (YES in S14 of FIG. 9), the controlling unit 30 selects the second process mode corresponding to the all pixel groups within the converted RGB image data 200 (S19 of FIG. 9). As above mentioned, a difference in the discharging amount of each nozzle in the print results of the multiple scan print (i.e., singling) does not readily appear than that of the print result of the single scan print. Further, normally, in a case where the printer 50 operates with the third print mode (the print mode corresponding to the singling), print time period is longer than the print time period of the printer 50 operating with the first print mode. Consequently, in a case where the binary data for the singling is generated, the controlling unit 30 selects the second process mode so as to reduce process load. As a result, the controlling unit 30 may generate the binary data fast. I.e., the controlling unit 30 may select the second process mode appropriately in a case where a debasement of image quality attributed to the variability of the discharging amount may not be so prominent and the print time period may be long.

In the present embodiment, "High Fineness" (i.e., the second print resolution) is designated (YES in S12 of FIG. 9), the controlling unit 30 select the second process mode corresponding to the all pixel groups within the converted RGB image data 200 (S19 of FIG. 9). Normally, in a case where print is performed in the second print resolution which is a higher resolution than the first print resolution, the debasement of image quality attributed to the variability of the discharging amount is more unnoticeable than in a case where the print is performed in the first print resolution. Further, normally, in the case where the print is performed in the second print resolution, the print time period is longer than the print time period when the print is performed in the first print resolution. Consequently, in the present embodiment, in a case where the second print resolution is selected, the controlling unit 30 may generate the binary data fast. In this case, as with the above, the controlling unit 30 may select the second process mode appropriately in the case where the debasement of the image quality attributed to the variability of the discharging amount may be unnoticeable and the print time period may be long.

Normally, whether or not the user desires a high quality image print depends on data types of data included in the print target data. In a case of the bitmap data (e.g., picture data etc.), it is highly possible that the user desires the high quality image print. By contrast, In a case of the text data (e.g., character data etc.), it is less possible that the user desires the high quality image print. In the present embodiment, the threshold is determined by the controlling unit 30 in accordance with data type of data (text data or bitmap data) constituting the original image data 100. The threshold determined in the case where the data type is the bitmap data is smaller than the threshold determined in the case where the data type is the text data. Consequently, in S34 of FIG. 9, in the case of the bitmap data, the first process mode is more likely to be selected, whereas in the case of the text data, the second process mode is more likely to be selected. That is, the controlling unit 30 may select an appropriate process in accordance with the data type.

Further, in the present embodiment, a type of the bitmap data is classified as being one of low density to high density bitmap data. The bitmap data type is classified by the value regarding the density (evaluating value). The lower the evaluating value is, the lower brightness (i.e., higher density) image is to be printed. Normally, the higher the density of the image is, the more prominent the variability of the discharging amount is. In present embodiment, the controlling unit 30 determined the threshold such that as the evaluating value being lower, the threshold is set smaller (S30 of FIG. 9). Further, as the evaluating value being greater, an image having the higher brightness (i.e., lower density) is printed. In this case, the threshold is determined to be greater when compared to a case where the evaluating value is small. As a result, the lower the evaluating value is, the more likely that the first process mode is selected. That is, the controlling unit 30 may select the first process mode appropriately in a case where the variability of the discharging amount is likely to stand out prominently.

Further, in the present embodiment, the controlling unit 30 selects the first process mode for the color corresponding to the nozzles that the variability of the discharging amount is great (S36 of FIG. 9), and the second process mode fro the color corresponding to the nozzles that the variability of the discharging amount is small (S38 of FIG. 9). In the case where the variability of the discharging amount is relatively great, the degree of debasement of the image quality attributed to the variability of the discharging amount is more severe. In the case where the variability of the discharging amount is relatively small, the degree of debasement of the image quality attributed to the variability of the discharging amount is milder. The controlling unit 30 may select the first process mode appropriately in a case where the degree of the debasement of the image quality is severely caused by a relatively large variability of the discharging amount. Further, the controlling unit 30 may select the second process mode, which may shorten the print time period, appropriately in a case where the degree of the debasement of the image quality is not severely caused due to a relatively small variability of the discharging amount. Further, in the present embodiment, the controlling unit 30 selects the process mode for each of the 4 color types. That is, the controlling unit 30 selects the first process mode for the color corresponding to the nozzle group having a large variability of the discharging amount, and the second process mode for the color corresponding to the nozzle group having a small variability of the discharging amount. Consequently, for the color corresponding to the nozzle group having the great variability of the discharging amount, the controlling unit 30 compensates the variability of the discharging amount by performing the first process mode. By contrast, for the color corresponding to the nozzle group having the small variability of the discharging amount, the controlling unit 30 may shorten the process time by performing the second process mode.

Further, in the present embodiment, the bitmap data types are discriminated by the minimum average value from each value of the R value, G value and B value of the pixels within the one area. The threshold is the smallest in a case where the evaluating value of the bitmap data corresponds to the smallest coverage. The greater the coverage of the evaluating value is, the greater the threshold becomes. As above mentioned, as the evaluating value is smaller, the image is printed with higher density. Further, as the density of the image being higher, the variability of the discharging amount becomes more likely to be prominent. In the present embodiment, the first process mode is more likely to be selected by decreasing the threshold corresponding to the bitmap to which the variability of the discharging amount is more likely to appear. By contrast, the second process mode is more likely to be selected by increasing the threshold corresponding to the bitmap to which the variability of the discharging amount is less likely to appear.

Moreover, the binary data generating process of the present embodiment may represent below. That is, the image process unit 32 of the PC 10 comprises the color conversion process unit 34 and the halftone process unit 42. The color conversion process unit 34 performs the color conversion process corresponding to each pixel within a specific image data (e.g., the converted RGB image data 200) represented by a first type of a color space (e.g., RGB) so as to generate target image data (e.g., the CMYK image data 210). The halftone process unit 42 performs the halftone process corresponding to the target image data so as to generate the processed image data (e.g., CMYK). The halftone process unit 42 comprises the correcting unit 43, the determining unit 44 and the error value calculating unit 45. The correcting unit 43 corrects a target pixel value (e.g., PV) within the target image data using a plurality of error values corresponding to a plurality of neighbor pixels neighboring a target pixel so as to generate a corrected value (e.g., PV). The determining value 44 determines whether or not forming a dot at a position on a print medium corresponding to the target pixel based on the corrected value (e.g., PV') and a threshold for outputting a dot corresponding the target pixel (e.g., Th). The error value calculating unit 45 calculates an error value corresponding to the target pixel in accordance with the determination regarding whether or not forming the dot for the target pixel. In a case where forming the dot for the target pixel is determined, the error value calculating unit 45 performs the specific process for calculating the error value corresponding to the target pixel using the corrected value (e.g., PV') and the converted RGB image data 200 (e.g., 255+target characteristic data).

Figure 13:
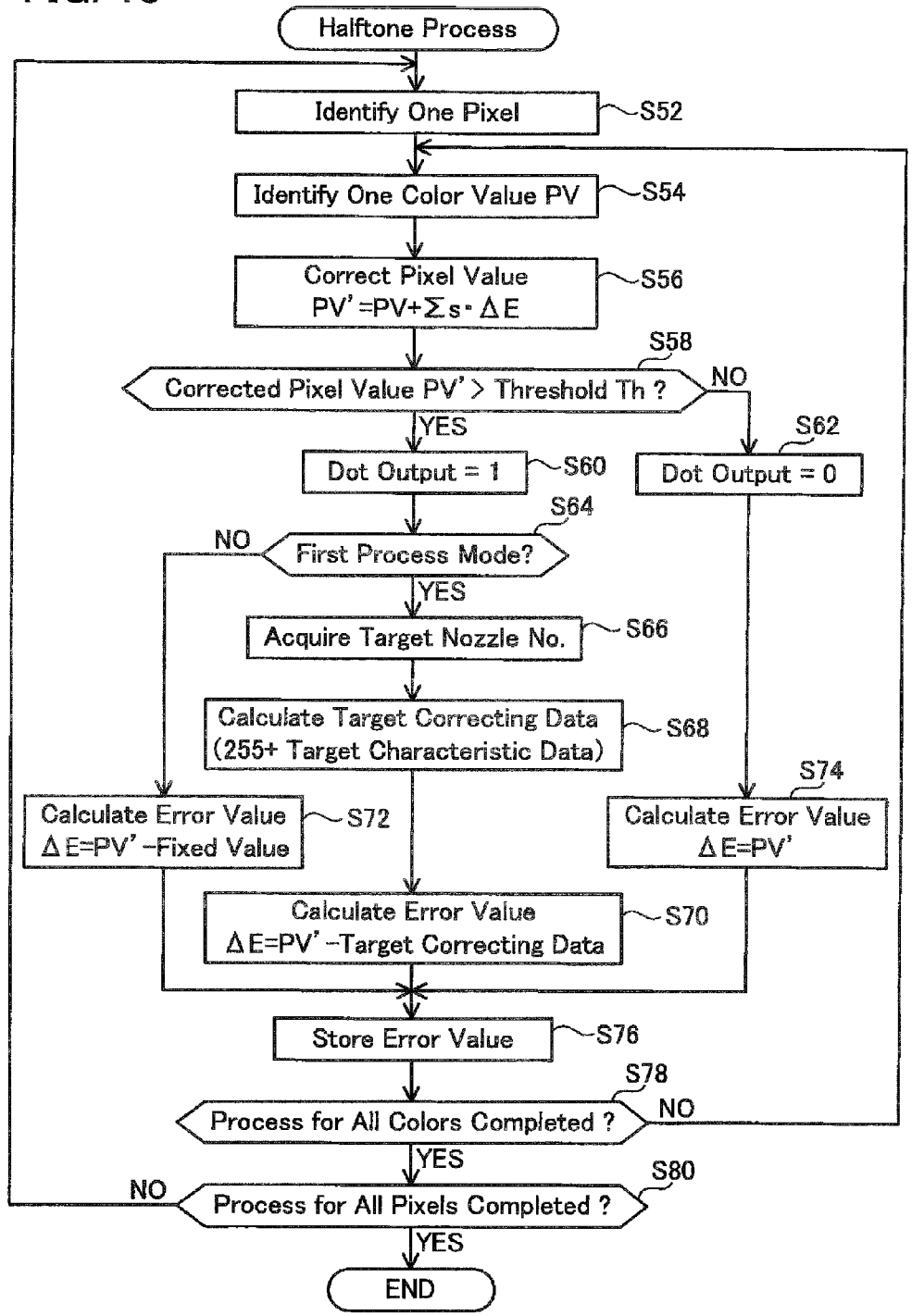
FIG. 13 shows a flowchart of a halftone process performed by the PC.

The PC 10 that includes the controlling unit 30 is an example of the "controlling device." The converted RGB image data 200, the CMYK image data 210, and the binary data generated in FIG. 13 are examples of the "specific image data," "target image data," and "processed image data", respectively Further, the color conversion process and the halftone process are examples of the "image process." The error value calculation process in S70 of FIG. 13 that is performed in the case where the dot output=1 in S60 is an example of the "specific process using correcting data," and The error value calculation process in S72 and S74 that are performed in the case where the dot output=1 in S60 is an example of the "specific process without using correcting data."

(Second Embodiment)

Different points are described below. In the present embodiment, the contents of the image data conversion process performed by the controlling unit 30 of the PC 10 differ from the first embodiment. The contents of the image data conversion process of the present embodiment will be described with reference to FIG. 16. S10 to S19 are identical to the first embodiment. In S20, the image process unit 32 acquires the characteristic data table 60 from PC 50 but does not acquire the threshold table 62. In a case where the original image data 100 is the pattern data or the combined data, the type discriminating unit 41 does not discriminate whether the bitmap data is one of the low density to high density bitmap data in S22. In a case where only the bitmap data have been discriminated in S22 (i.e., in a case where the original image data 100 is the pattern data), in S24, the image process unit 32 stores a combination of the all pixel specifying information and the information indicating the bitmap data in the work area 22. Further, in a case where the text data and the bitmap data have been discriminated in S22, the image process unit 32 stores a combination of the information for specifying the pixel group corresponding to the first area 112 and the information indicating the text data in the work area 22 and a combination of the information for specifying the pixel group corresponding to the second area 122 and the information indicating the bitmap data in the work area 22.

Figure 16:
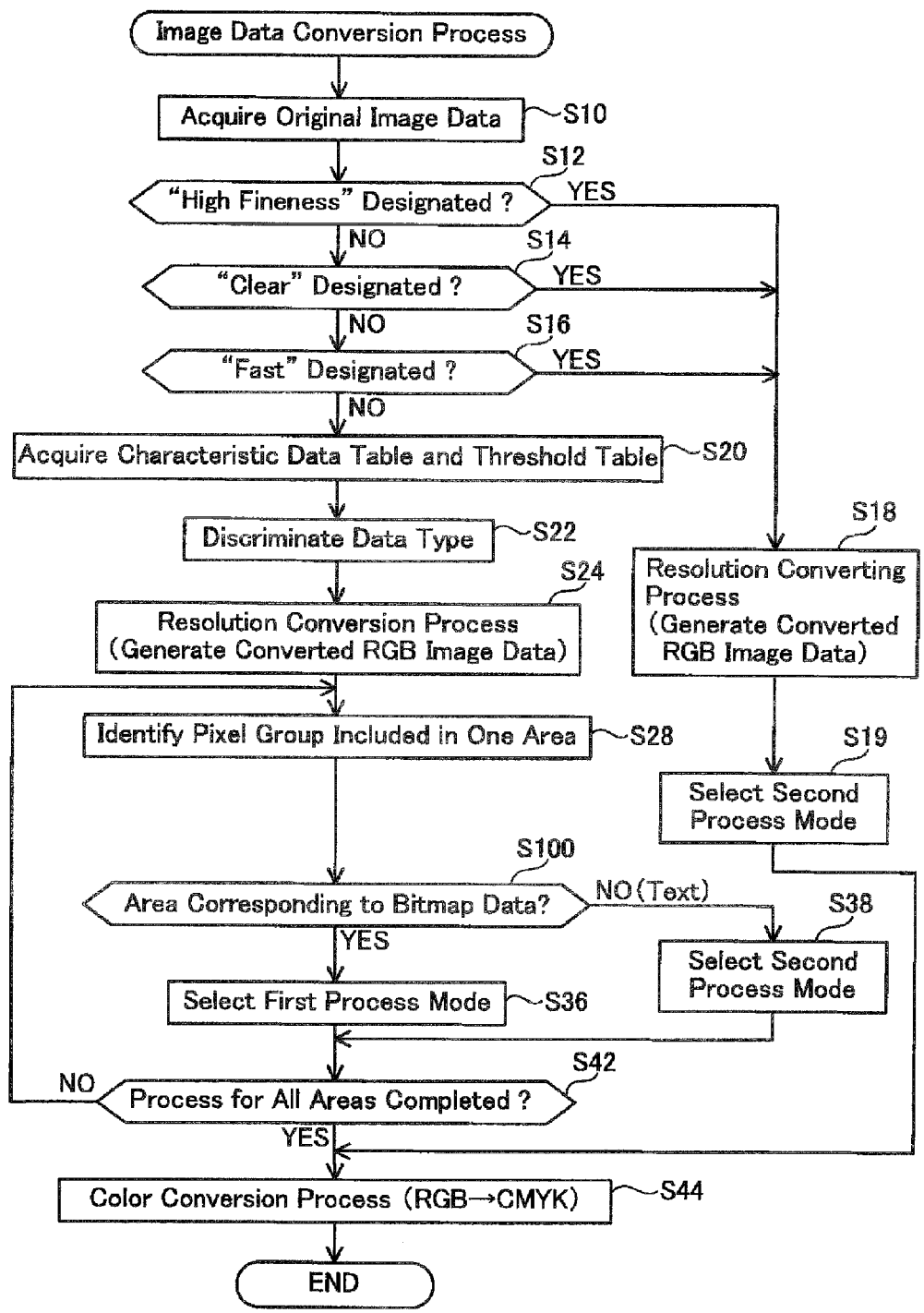
FIG. 16 shows a flowchart of an image data conversion process performed by a PC of a second embodiment.

S28 is identical to the first embodiment. The selecting unit 36 does not perform S30 to S34. The selecting unit 36 determines whether or not the pixel group (i.e., one area) and the information indicating the bitmap data are specified in S28 (S100). If YES in S100, the process proceeds to S36. If NO in S100, the process proceeds to the S38. That is, in the present embodiment, the selecting unit 36 does not select the process mode based on a comparison of an index value related to the variability of the discharging amount (e.g., the difference between the maximum and minimum of the discharging amount in the first embodiment) and the threshold. In the present embodiment, the selecting unit 36 selects the process mode in accordance with the data type specified in S28. Specifically, in a case where the pixel group specified in S28 is corresponding to the bitmap data (YES in S100), the selecting unit 36 selects the first process mode (S36). In a case where the pixel group specified in S28 is corresponding to the text data (NO in S100), the selecting unit 36 selects the second process mode (S38). In the present embodiment, differing form the first embodiment, a specific process mode for each of the four color types is not selected. Upon ending S36 or S38, the process proceeds to S42. S42 to S44 are identical to the first embodiment. Moreover, when the image data conversion process of FIG. 16 is completed, the halftone process unit 42 etc. performs the halftone process (referring to FIG. 13). Meanwhile, in S64 of FIG. 13, the halftone process unit 42 determines whether or not the process mode corresponding to the target pixel is the first process mode. Other processes are identical to the first embodiment.

The present embodiment has been described in detail. In the present embodiment, similar to the first embodiment, the controlling unit 30 may select the process mode appropriately in accordance with states. The controlling unit 30 selects the process mode in accordance with the data type of data including in the converted RGB image data 200. Consequently, for example, the controlling unit 30 selects the first process mode in a situation of printing in accordance with the bitmap data 110 (data of picture etc.) including the original image data 100 (i.e., in which case it is highly possible that the user desires the high quality image print). Further, for example, the controlling unit 30 selects the second process mode to shorten the print time period in a situation of printing in accordance with the text data (i.e., in which case it is more unlikely that the user desires the high quality image print). Consequently, the controlling unit 30 may select an appropriate process in accordance with the data type of data included in the original image data 100.

(Third Embodiment)

Figure 17:
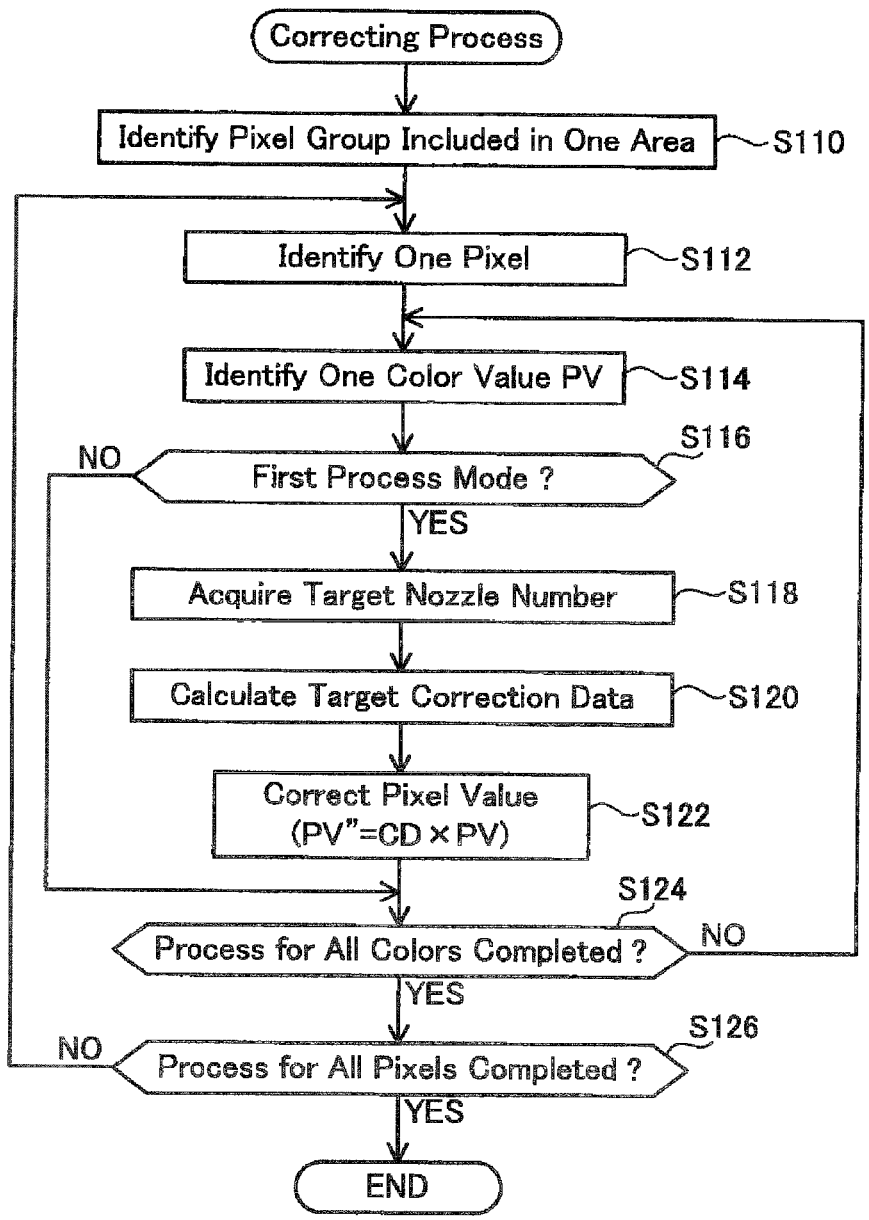
FIG. 17 shows a flowchart of a correction process performed by a PC of a third embodiment.

Features of the third embodiment different from the first embodiment will be described below. In the present embodiment, upon ending the image data conversion process of FIG. 9, the controlling unit 30 of the PC 10 performs a correction process. The correction process includes S110 to S126 of FIG. 17. In the correction process, the color conversion process unit 34 (referring to FIG. 1) first specifies one pixel (i.e., a target pixel) within the CMYK image data 210 (S110). The sequence for specifying one pixel in S110 is identical to S52 of FIG. 13. Next, the color conversion process unit 34 specifies one value (e.g., a K value) from four values of CMYK constituting the target pixel (S112). The color conversion process unit 34 determines whether or not the process mode corresponding to the target color (e.g., K) of the target pixel is the first process mode (S116). The determining process in S116 is identical to S64 of FIG. 13. If NO in S116, the process proceeds to S124, skipping S118 to S122. If YES in S116, the color conversion process unit 34 performs S118 specifying the target nozzle number using the identical method as S66 of FIG. 13. Next, the correction data calculating unit 39 calculates (255+minimum characteristic data)/(255+target characteristic data) so as to calculate the target correction data CD (i, j). For example, the target correction data CD (i, j) for the target pixels of the line j is the same value. Moreover, the "minimum characteristic data" is characteristic data showing a minimum discharging amount from among the n sets of characteristic data corresponding to the n nozzles of the color corresponding to the FV specified in S114. As described above, in the present embodiment, the "minimum characteristic data" is zero. Upon ending S120, the process proceeds to S122. In S122, the color conversion process unit 34 multiplies the target correction data CD (i, j) by the PV j) so as to calculate a corrected pixel value PV''' (i, j). S124 and S126 are identical to S78 and S80 of FIG. 13.

The color conversion process unit 34 calculates the corrected pixel value PV''' (1, j) for each of the four values CMYK that constitute the target pixel 216. Consequently, based on the target pixel 216, a corrected pixel is generated having four corrected values corresponding to the four colors CMYK. The color conversion process unit 34 generates corrected pixels, in the same manner, for the pixels other than the pixel 216. The corrected image data 250 shown in FIG. 18 is thus obtained. As described above, the color conversion process unit 34 performs the correction process within the CMYK color space so as to generate the corrected image data 250 from the CMYK image data 210.

As above described, in a case where the color conversion process unit 34 determines the process mode corresponding to the target color of the target pixel is the first process mode, the target color value PV of the target pixel is corrected. The converted image data 250 shown in FIG. 18 is an example that the process mode corresponding to the all four type colors of pixels at upper row is the second process mode and the process mode corresponding to the all four type colors of pixels at lower row is the first process mode.

Upon ending the correction process, the halftone process unit 42 performs the halftone process on the corrected image data 250. The halftone process of the present embodiment differs from the halftone process of FIG. 13 (S52 to S80) in the following points. In S52, the target pixel within the corrected image data 250 is specified and, in S54, one value PV''' (the corrected value obtained in S58) is specified from among the four values that constitute the target pixel. In S56, the PV' is calculated by adding the error value (i.e., Σs·ΔE) to the PV''' specified in S54. The processes S64 to S70 shown in FIG. 13 are not performed. That is, Upon performing S60, next, the halftone process unit 42 performs S72. The other processes are identical to those of the first embodiment.

The binary data generating process (including the image data conversion process, correcting process and halftone process) of the present embodiment may represent below. That is, the image process unit 32 comprises the color conversion process unit 34 and the halftone process unit 42. The color conversion process unit 34 performs a specific process including the color conversion process and the correcting process corresponding to each pixel within target image data (e.g., the converted RGB image data 200) represented by a first type of the color space (e.g., RGB) so as to generate color converted image data (e.g., the corrected image data 250) represented by a second type of the color space (e.g., CMYK). The halftone process unit 42 performs the halftone process on the color converted image data so as to generate processed image data (e.g., the binary data). The color conversion process unit 34 performs the color conversion process on the target pixel within the target image data (e.g., the converted RGB image data 200) so as to generate a color converted pixel (e.g., PV) represented by the second type color space. Further, the color conversion process unit 34 performs the correcting process using the correction data (e.g., CD) on the color converted pixel within the second type color space so as to generate the corrected pixel (e.g., PV''')

The third embodiment has been described in detail. In the third embodiment also, results similar to those of the first embodiment may be obtained. Moreover, the converted RGB image data 200 generated in S24 of FIG. 16 is an example of the "specific image data" and "target image data". Further, the color conversion process and the halftone process are examples of the "image process," and the color conversion process and the correction process is an example of the "specific process."

Variants of the aforementioned embodiments are given below.

(1) The original image data 100 of FIG. 10 includes only one bitmap data 120. However, the original image data 100 may include a plurality of bitmap data. In this case, for each of a plurality of areas corresponding to a plurality of bitmap data, a bitmap data type of data corresponding to the area may be discriminated. In the present variant, each of the plurality of areas is one example of "partial area," and each of the plurality of bitmap data is one example of "partial data."

(2) In aforementioned embodiments, the original data may include the text data and the bitmap data. However, the original data may include drawing data represented drawing command for drawing a quadrangle etc. In this variant, the controlling unit 30 may process the drawing data identical to the text data.

(3) In FIG. 9, all of S12 to S16 may be omitted or one or two steps of S12 to S16 may be omitted. Further in FIG. 9, if NO in each of S12, S14 and S16, S20, S22 and S28 to S42 may be omitted and the first process mode may be selected. Moreover, in the present variant, one or two steps of S12 to S16 may be omitted. For example, in a case where "Clear" is designated, the second process mode may be necessarily selected, and in a case where "Clear" is not designated, the first process mode may be necessarily selected. Similarly, For example, in a case where "High Fineness" is not designated, the first process mode may be necessarily selected, and in a case where "High Fineness" (or "Fast") is designated, the second process mode may be necessarily selected.

(4) In the aforementioned embodiments, the controlling unit 30 of the PC 10 comprises the image process unit 32 and the supplying unit 48. Instead, the printer 50 may comprise the image process unit 32 and the supplying unit 48. In this case, the printer is an example of the "controlling device."

(5) In the aforementioned embodiments, the PC 10 acquires the characteristic data table 60 from the printer 50 after a print instruction from the user. However, the PC 10 may acquire the characteristic data table 60 from the printer 50 when the printer driver 24 is installed in the PC 10, and may store the characteristic data table 60. Further, the PC 10 may acquire necessary characteristic data from the printer 50 each time S32 of FIG. 7 and S68 of FIG. 13 is performed.

(6) In the aforementioned embodiments, the second print resolution corresponding to the second print mode is two times the first print resolution corresponding to the first print mode. However, the second print resolution may be three times the first print resolution, or greater. For example, if the second print resolution is three times the first print resolution, one raster is formed by the second main scan between two adjacent rasters formed by the first main scan, and one raster is formed by the third main scan between the two adjacent rasters.

(7) In the aforementioned embodiments, the halftone process unit 42 generates binary data that indicates dot output=1, and dot output. However, the halftone process unit 42 may generate ternary, or greater, data. For example, the halftone process unit 42 may use a threshold Th1 (e.g., 191) for discriminating between a large dot and a medium dot, a threshold Th2 (e.g., 127) for discriminating between the medium dot and a small dot and a threshold Th3 (e.g., 63) for discriminating between the small dot and a no dot. In the present variant, the halftone process unit 42 may change the target correction data calculated in S68 of FIG. 13 in accordance with dot size to be formed. For example, in the case of forming a medium dot, the halftone process unit 42 may specify (255+the target characteristic data)×(density to be expressed as the medium dot)/(density to be expressed as the large dot (e.g., 255)) as the target correction data and, in the case of forming a small dot, may specify (255+AVE)×(density to be expressed as the small dot)/(density to be expressed as the large dot (e.g., 255)) as the target correction data.

(8) In the aforementioned embodiments, the combination of the target pixel and the error value calculated in S70 to 74 is stored in S76 of FIG. 13. In S56 of FIG. 13, the correcting unit 43 collects the error value (the error value corresponding to neighboring pixels of the target pixel) stored in S76 of FIG. 13 so as to calculate the PV'. Instead of this configuration, in S76, the correcting unit 43 may assign the error values calculated in S70 to S74 of FIG. 13 to unprocessed pixels neighboring the target pixel. For example, if the error value ΔEk (i, j) corresponding to K of the pixel 216 of FIG. 14 has been calculated, the correcting unit 43 may calculate, in S76, the sum of K (i+1, j), which is the K value of the unprocessed pixel 217, and the value from multiplying the error value ΔEk by the coefficient s so as to calculate a new K value of the pixel 217. In a case where this configuration is adopted, the PV specified in S54 of FIG. 13 is identical to the PV', and the process S56 of FIG. 13 is not performed.

(9) In the third embodiment, the halftone process unit 42 performs the halftone process using the error diffusion method. However, the halftone process may instead be performed using the dither method.

(10) In the aforementioned embodiment, in singling, two nozzles form one raster by two main scans. However, one nozzle may instead form one raster by two main scans. Further, three or more nozzles may form one raster by three or more main scans.

(11) In the characteristic data table 60 of FIG. 3, for each color CMYK, characteristic data corresponding to the nozzle having the minimum discharging amount is set at zero. However, for example, characteristic data corresponding to a nozzle having a predetermined standard discharging amount may be set at zero. In this case, minus value characteristic data may be present in the characteristic data table 60 of FIG. 3.

(12) In the first embodiment, the number value "255" is adopted for calculating the target correction data (AVE+255) in S68 of FIG. 13. Instead of this configuration, a number value other than "255" may be used as the number value for calculating the target correction data. Further, in the second embodiment, as well, when the target correction data is to be calculated, (255+minimum characteristic data)/(255+the target characteristic data) has been adopted. Instead of this configuration, a number value other than "255" may be used as the number value for calculating the target correction data.

(13) In the aforementioned embodiments, the correction data calculating unit 39 calculates the correction data using the target characteristic data of the target nozzle. However, the correction data calculating unit 39 may calculate the correction data using the target characteristic data of the target nozzle and characteristic data of a specific nozzle. The specific nozzle is a nozzle forming a raster neighboring a raster including a dot forming the target nozzle (termed "target raster" below). For example, in FIG. 5 (first print mode), in a case where the target nozzle for K is nozzle Nk4 (the target raster is R4), the specific nozzles may be nozzles Nk2, Nk3 and Nk5 to Nk7 forming rasters R2, R3 and R5 to R7. In this case, the halftone process unit 42 may acquire the target nozzle number and numbers of the specific nozzles (termed "specific nozzle number" below). In the case where the target correction data is calculated in S68 of FIG. 13, the halftone process unit 42 may acquire not only the target characteristic data corresponding to the target nozzle number but also characteristic data corresponding to the specific nozzle number for each of a plurality of the specific nozzle numbers. Next, the correction data calculating unit 39 may specify characteristic data for each of the plurality of the specific nozzles similar to the method for specifying the target characteristic data in the aforementioned embodiments. Next, the correction data calculating unit 39 may add an average of the target characteristic data corresponding to the target nozzle number and a plurality of characteristic data corresponding to the plurality of the specific nozzle numbers so as to calculate the target correction data.

(14) In the characteristic data table 60 of FIG. 3, the characteristic data corresponding to the nozzle having the minimum discharging amount may be set at 255. I.e., the characteristic data may be a value obtained by adding 255 to the value shown in FIG. 3. In this case, acquiring the target characteristic data table 60 (e.g., 255) in S68 of FIG. 13 is identical to acquiring the target correction data. That is, in this variant, "target characteristic data" and "correction data" is identical. This variant is also included the configuration of "correction data is data acquired using target characteristic data".

(15) A technique disclosed in the present application may be applied to a patterning apparatus for forming a pattern of a substrate.

(16) In the foregoing embodiment, respective units 32 to 48 are realized as a result of the controlling unit 30 performing the processes according to the program 24. Nevertheless, at least one unit of respective units 32 to 48 may alternately be realized by a hardware resource such as a logic circuit.

The invention claimed is:

1. An image processing apparatus comprising:
a memory storing a table that contains characteristic data corresponding to each of a plurality of nozzles of a print head of a printer, each characteristic data being determined in accordance with a difference between an actual discharging amount of an ink droplet from a corresponding nozzle and a reference discharging amount of an ink droplet from the corresponding nozzle; and
a controller configured to:
  receive original image data;
  determine whether the original image data is processed in a first process mode or a second process mode,
  determine a first target pixel, which is one of a plurality of pixels included in the original image data;
  determine a first pixel value of the first target pixel;
  determine a first corrected pixel value of the first target pixel in accordance with a particular error value;
  when it is determined that the original image data is processed in the first process mode:
    determine a first target nozzle, which is one of the plurality of nozzles of the print head and corresponds to the first target pixel;
    retrieve, from the table stored in the memory, first characteristic data of the first target nozzle;
    determine a first correction data for the first target pixel in accordance with the first characteristic data; and
    determine a first error value in accordance with the first corrected pixel value and the determined first correction data;
  when it is determined that the original image data is processed in the second process mode, determine a second error value in accordance with the first corrected pixel value and a fixed value;
  determine a second target pixel, which is one of a plurality of pixels included in the original image data and adjacent to the first target pixel;
  determine a second pixel value of the second target pixel;
  determine a second corrected pixel value of the second target pixel in accordance with the first error value when it is determined that the original image data is processed in the first process mode; and
  determine a second corrected pixel value of the second target pixel in accordance with the second error value when it is determined that the original image data is processed in the second process mode.

2. The image processing apparatus as in claim 1, wherein
it is determined that the original image data is processed in the first process mode when a first resolution is designated, and
it is determined that the original image data is processed in the second process mode when a second resolution greater than the first resolution is designated.

3. The image processing apparatus as in claim 1, wherein
it is determined that the original image data is processed in the first process mode when a first number of main scan of the print head for a specific resolution is designated, and
it is determined that the original image data is processed in the second process mode when a second number, greater than the first number, of main scan of the print head for the specific resolution is designated.

4. The image processing apparatus as in claim 1, wherein
it is determined that the original image data is processed in the second process mode when a relatively short print time period is designated, and
it is determined that the original image data is processed in the first process mode when the relatively short print time period is not designated.

5. The image processing apparatus as in claim 1, wherein the controller is further configured to:
decide whether or not an index value related to variability of characteristic data corresponding to the plurality of nozzles is greater than a threshold, and
it is determined that the original image data is processed in the first process mode when the index value is decided as being greater than the threshold, and
it is determined that the original image data is processed in the second process mode when the index value is decided as not being greater than the threshold.

6. The image processing apparatus as in claim 5, wherein the controller is further configured to:
discriminate a type of partial data corresponding to at least a partial area of an image represented by the original image data; and
determine the threshold for the partial area in accordance with the type of partial data, and
it is determined that the partial data is processed in the first process mode when the index value is decided as being greater than the threshold, and
it is determined that the partial data is processed in the second process mode when the index value is decided as not being greater than the threshold.

7. The image processing apparatus as in claim 1, wherein the controller is further configured to:
discriminate a type of partial data corresponding to at least a partial area of an image represented by the original image data, and
it is determined that the partial data is processed in the first process mode when the type of partial data is a first type of data, and
it is determined that the partial data is processed in the second process mode when the type of partial data is a second type of data.

8. A non-transitory computer readable medium including computer program executable in an image processing apparatus that is configured to control a printer, the printer comprising a print head and a memory, the print head having a plurality of nozzles for discharging liquid droplets, the memory storing a table that contains characteristic data corresponding to each of the plurality of nozzles, each characteristic data being determined in accordance with a difference between an actual discharging amount of an ink droplet from a corresponding nozzle and a reference discharging amount of an ink droplet from the corresponding nozzle, wherein the computer program includes instructions that, when executed, cause the image processing apparatus to:
receive original image data;
determine whether the original image data is processed in a first process mode or a second process mode,
determine a first target pixel, which is one of a plurality of pixels included in the original image data;
determine a first pixel value of the first target pixel;
determine a first corrected pixel value of the first target pixel in accordance with a particular error value;
when it is determined that the original image data is processed in the first process mode:
determine a first target nozzle, which is one of the plurality of nozzles of the print head and corresponds to the first target pixel;
retrieve, from the table stored in the memory, first characteristic data of the first target nozzle;
determine a first correction data for the first target pixel in accordance with the first characteristic data; and
determine a first error value in accordance with the first corrected pixel value and the determined first correction data;
when it is determined that the original image data is processed in the second process mode, determine a second error value in accordance with the first corrected pixel value and a fixed value;
determine a second target pixel, which is one of a plurality of pixels included in the original image data and adjacent to the first target pixel;
determine a second pixel value of the second target pixel;
determine a second corrected pixel value of the second target pixel in accordance with the first error value when it is determined that the original image data is processed in the first process mode; and
determine a second corrected pixel value of the second target pixel in accordance with the second error value when it is determined that the original image data is processed in the second process mode.

* * * * *